(12) United States Patent
Choi et al.

(10) Patent No.: US 11,462,831 B2
(45) Date of Patent: Oct. 4, 2022

(54) ANTENNA MODULE AND RADIO FREQUENCY APPARATUS INCLUDING THE SAME

(71) Applicant: SAMSUNG ELECTRONICS CO., LTD., Suwon-si (KR)

(72) Inventors: Dooseok Choi, Hwaseong-si (KR); Youngki Lee, Suwon-si (KR); Sunwoo Lee, Suncheon-si (KR); Thomas Byunghak Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 373 days.

(21) Appl. No.: 16/502,241

(22) Filed: Jul. 3, 2019

(65) Prior Publication Data

US 2020/0136269 A1 Apr. 30, 2020

(30) Foreign Application Priority Data

Oct. 24, 2018 (KR) ........................ 10-2018-0127691

(51) Int. Cl.
*H01Q 9/04* (2006.01)
*G06K 19/077* (2006.01)
(Continued)

(52) U.S. Cl.
CPC ..... *H01Q 9/0414* (2013.01); *G06K 19/07786* (2013.01); *H01Q 1/2283* (2013.01);
(Continued)

(58) Field of Classification Search
CPC .... H01Q 9/0421; H01Q 9/045; H01Q 1/2283; H01Q 5/28; H01Q 9/0414; G06K 19/00786

See application file for complete search history.

(56) References Cited

U.S. PATENT DOCUMENTS 6,239,750 B1 5/2001 Snygg
6,639,558 B2 10/2003 Kellerman et al.
(Continued)

FOREIGN PATENT DOCUMENTS

KR 10-1014352 B1 2/2011

OTHER PUBLICATIONS

Hong, W., "Solving the 5G Mobile Antenna Puzzle", 2017, IEEE Microwave Magazine, p. 86-102, 17 pages total.

*Primary Examiner* — Andrea Lindgren Baltzell
*Assistant Examiner* — Amal Patel
(74) *Attorney, Agent, or Firm* — Sughrue Mion, PLLC

(57) ABSTRACT

A radio frequency (RF) apparatus includes a radio frequency integrated circuit (RFIC) chip and an antenna module disposed on an upper surface of the RFIC chip. The antenna module includes a first antenna patch that is in parallel with the RFIC chip, the first antenna patch including a first penetration point, and a first power feed point connected to a first power feed line to transmit and receive a first RF signal of a first frequency band; and a second antenna patch disposed above the first antenna patch in parallel with the first antenna patch, the second antenna patch including a second power feed point connected to a second power feed line that penetrates through the first penetration point to transmit and receive a second RF signal of a second frequency band. The first penetration point is formed in a first region of the first antenna patch in which influence on an electric field generated by the first antenna patch via the first power feed point is minimized.

18 Claims, 21 Drawing Sheets

(51) Int. Cl.
  *H01Q 1/22*  (2006.01)
  *H01Q 5/28*  (2015.01)
  *H01Q 5/40*  (2015.01)

(52) U.S. Cl.
  CPC ............... *H01Q 5/28* (2015.01); *H01Q 5/40* (2015.01); *H01Q 9/045* (2013.01); *H01Q 9/0435* (2013.01)

(56) References Cited

U.S. PATENT DOCUMENTS

| | | |
|---|---|---|
| 8,354,972 B2 | 1/2013 | Borja et al. |
| 9,105,961 B2 | 8/2015 | Feller et al. |
| 9,972,918 B2 | 5/2018 | Lin et al. |
| 2017/0352960 A1 | 12/2017 | Zhang |
| 2018/0102594 A1 | 4/2018 | Murdock et al. |
| 2018/0358701 A1* | 12/2018 | Gimersky ................ H01Q 9/16 |
| 2019/0020110 A1* | 1/2019 | Paulotto ............... H01Q 9/0414 |
| 2020/0021019 A1* | 1/2020 | Rajagopalan ........ H01Q 9/0414 |

* cited by examiner

ANTENNA MODULE AND RADIO
FREQUENCY APPARATUS INCLUDING THE
SAME

CROSS-REFERENCE TO RELATED
APPLICATION

This application claims priority from Korean Patent Application No. 10-2018-0127691, filed on Oct. 24, 2018, in the Korean Intellectual Property Office, the disclosure of which is incorporated by reference herein in its entirety.

BACKGROUND

1. Field

Apparatuses, devices and articles of manufacture consistent with the present disclosure relate to an antenna module for transmitting/receiving a radio frequency (RF) signal and an RF apparatus including the antenna module.

2. Description of Related Art

An antenna used in wireless communication is a reversible device that may include a conductor. A signal may be transmitted when the conductor radiates electromagnetic waves and may be guided when the electromagnetic wave reaches the conductor. The conductor included in the antenna may have various shapes, and an antenna including a conductor of a suitable shape according to an application may be used. For example, a patch antenna that is a kind of a planar antenna may include a ground plate, a low-loss dielectric on the ground plate, and a patch on the low-loss dielectric, and is mainly used in mobile applications.

In addition, as communication systems have developed, users may be provided with wideband data communication service using millimeter waves (e.g., fifth generation (5G) service) under a new radio (NR) environment. Accordingly, research has been conducted into a structure of an antenna capable of effectively transmitting/receiving millimeter waves in order to support the wideband data communication service.

SUMMARY

It is an aspect to provide an antenna module capable of effectively transmitting/receiving data under a new radio (NR) environment and a radio frequency (RF) apparatus including the antenna module.

According to an aspect of an embodiment, there is provided a radio frequency (RF) apparatus comprising a radio frequency integrated circuit (RFIC) chip and an antenna module disposed on an upper surface of the RFIC chip, wherein the antenna module comprises a first antenna patch that is in parallel with the RFIC chip, the first antenna patch comprising a first penetration point, and a first power feed point connected to a first power feed line to transmit and receive a first RF signal of a first frequency band; and a second antenna patch disposed above the first antenna patch in parallel with the first antenna patch, the second antenna patch comprising a second power feed point connected to a second power feed line that penetrates through the first penetration point to transmit and receive a second RF signal of a second frequency band, wherein the first penetration point is formed in a first region of the first antenna patch in which influence on an electric field generated by the first antenna patch via the first power feed point is minimized.

According to another aspect of an embodiment, there is provided an antenna module comprising a ground plate; a first antenna patch disposed above the ground plate to be in parallel with the ground plate and comprising a first penetration point, and a first power feed point connected to a first power feed line to radiate first electromagnetic waves corresponding to a first frequency band; a second antenna patch disposed above the first antenna patch to be in parallel with the first antenna patch and comprising a second power feed point connected to a second power feed line penetrating through the first penetration point; and a third antenna patch disposed above the second antenna patch to be in parallel with the second antenna patch, wherein the second antenna patch and the third antenna patch are configured to radiate second electromagnetic waves corresponding to a second frequency band.

According to another aspect of an embodiment, there is provided an antenna module comprising a first circular antenna patch comprising a first penetration point, a second penetration point, a first power feed point connected to a first power feed line, and a second power feed point connected to a second power feed line, the first circular antenna patch being configured to radiate first electromagnetic waves corresponding to a first frequency band; a second circular antenna patch disposed above the first circular antenna patch in parallel with the first circular antenna patch and comprising a third power feed point connected to a third power feed line passing through the first penetration point and a fourth power feed point connected to a fourth power feed line passing through the second penetration point; and a third circular antenna patch disposed above the second circular antenna patch to be in parallel with the second circular antenna patch, wherein the second circular antenna patch and the third circular antenna patch are configured to radiate second electromagnetic waves corresponding to a second frequency band, and the first penetration point and the second penetration point are formed in a center region of the first circular antenna patch, in which influence on an electric field generated by the first circular antenna patch is reduced.

According to another aspect of an embodiment, there is provided an apparatus comprising a radio frequency integrated circuit (RFIC) chip; and an antenna module disposed on an upper surface of the RFIC chip, the antenna module comprising a first antenna patch comprising a first power feed point connected to a first power feed line to transmit and receive a first millimeter-wave signal of a first frequency band, and a first penetration point formed at a portion of a weakest electric field generated by the first antenna patch; and a second antenna patch disposed above and in parallel with the first antenna patch, the second antenna patch comprising a second power feed point connected to a second power feed line to transmit and receive a second millimeter-wave signal of a second frequency band, the second power feed line penetrating through the first penetration point.

BRIEF DESCRIPTION OF THE DRAWINGS

Embodiments will be more clearly understood from the following detailed description taken in conjunction with the accompanying drawings in which.

DETAILED DESCRIPTION

Hereinafter, embodiments will be described in detail with reference to accompanying drawings.

Figure 1:
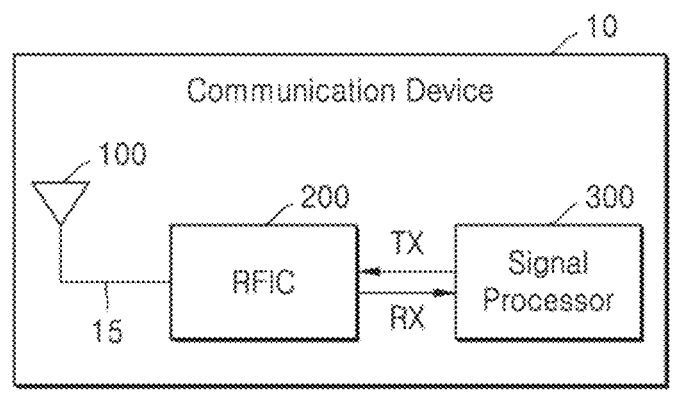
FIG. 1 is a block diagram of a communication device according to an embodiment.

FIG. 1 is a block diagram of a communication device according to an embodiment.

As shown in FIG. 1, a communication device 10 may include an antenna 100 and may communicate with another communication device in a wireless communication system by transmitting/receiving signals via the antenna 100, and may be referred to as a wireless communication device.

A wireless communication system, in which the communication device 10 communicates with a counterpart communication device, may be a wireless communication system using a cellular network such as a next generation communication system, a fifth generation (5G) wireless system, a long term evolution (LTE) system, an LTE-Advanced system, a code division multiple access (CDMA) system, a global system for mobile communications (GSM) system, a wireless local area network (WLAN) system, etc., or another arbitrary wireless communication system. Hereinafter, the wireless communication system will be described based on a wireless communication system using a cellular network, but one or more embodiments are not limited thereto.

As shown in FIG. 1, the communication device 10 may include the antenna 100, a radio frequency integrated circuit (RFIC) 200, and a signal processor 300, and the antenna 100 and the RFIC 200 may be connected to each other via a power feed line 15. In the current specification, the antenna 100 may be referred to as an antenna module, and a structure including the antenna 100 and the power feed line 15 may be overall referred to as an antenna module. Also, the antenna 100, the power feed line 15, and the RFIC 200 may be overall referred to as an RF system or an RF apparatus.

The RFIC 200 may provide the antenna 100 with a signal via the power feed line 15, wherein the signal is generated by processing a transmission signal TX from the signal processor 300 in a transmission mode and may provide the signal processor 300 with a received signal RF by processing a signal transmitted from the antenna 100 via the power feed line 15 in a reception mode. For example, the RFIC 200 may include a transmitter that may include a filter, a mixer, and a power amplifier (PA). Also, the RFIC 200 may include a receiver that may include a filter, a mixer, a low-noise amplifier (LNA). In some embodiments, the RFIC 200 may include a plurality of transmitters and a plurality of receivers, or may include a transceiver in which a transmitter is combined with a receiver. In some embodiments, the RFIC 200 may include a plurality of transceivers.

The signal processor 300 may generate a transmission signal TX by processing a signal including information to be transmitted and may generate the signal including information by processing a received signal RX. For example, the signal processor 300 may include an encoder, a modulator, and a digital-to-analog converter (DAC) in order to generate the transmission signal TX. In addition, the signal processor 300 may include an analog-to-digital converter (ADC), a demodulator, and a decoder in order to process the received signal RX. The signal processor 300 may generate a control signal for controlling the RFIC 200. The signal processor 300 may set a transmission mode or a reception mode, or adjust electric power and gains of elements included in the RFIC 200 via the control signal. In some embodiments, the signal processor 300 may include one or more cores, and a memory that stores instructions executed by the one or more cores, and at least a part of the signal processor 300 may include a software block stored in the memory. In some embodiments, the signal processor 300 may include a logic circuit designed by logic synthesis, and at least a part of the signal processor 300 may include a hardware block implemented as a logic circuit.

The wireless communication system may regulate a high spectrum band for a large data transmission amount. For example, a 5G cellular system (or 5G wireless system) officially designated as IMT-2020 by the International telecommunication union (ITU) regulates millimeter waves (mmWave) of 24 GHz or greater. The antenna 100 according to an embodiment may be configured to transmit/receive (or radiate electromagnetic waves in an RF band) signals in the RF band that is used in data transmission of mmWave, and moreover the antenna 100 may be configured to transmit/receive signals (or radiate electromagnetic waves in a low frequency band) in a low frequency band that is relatively low as compared with the RF band. The antenna 100 may be a multi-band antenna capable of supporting RF signal transmission/reception in at least two frequency bands. In addition, the antenna 100 may be configured to perform multi-polarized radiation of the electromagnetic waves, in addition to the support of multi-band.

According to an embodiment, the antenna 100 may include at least two antenna patches. The antenna patches may be stacked in parallel with each other, and each of the antenna patches may be configured to transmit/receive signals from different frequency bands. Each of the antenna patches may include at least one power feed point to which a signal is supplied from a power feed line in order to radiate electromagnetic waves. Between the antenna patches, a first antenna patch may further include at least one penetration point, and a power feed line connected to a power feed point of a second antenna patch above the first antenna patch may penetrate through the penetration point. The penetration point of the first antenna patch may be formed in a region, in which influence to an electric field generated from the power feed point of the first antenna patch may be reduced. Detailed examples of the antenna 100 will be described later.

The antenna 100 according to an embodiment may be implemented as a small-sized antenna module through an efficient arrangement structure, and may simultaneously support the multi-polarization and the multi-band.

Figure 2A:
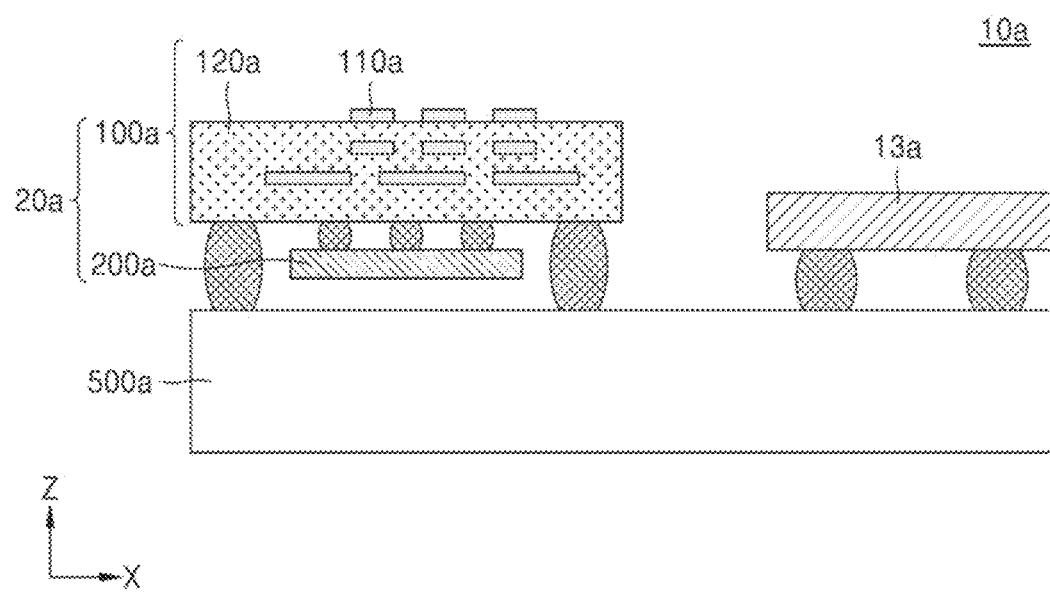
FIGS. 2A to 2C are diagrams showing examples of a layout of elements in the communication device of FIG. 1, according to an embodiment.
Figure 2B:
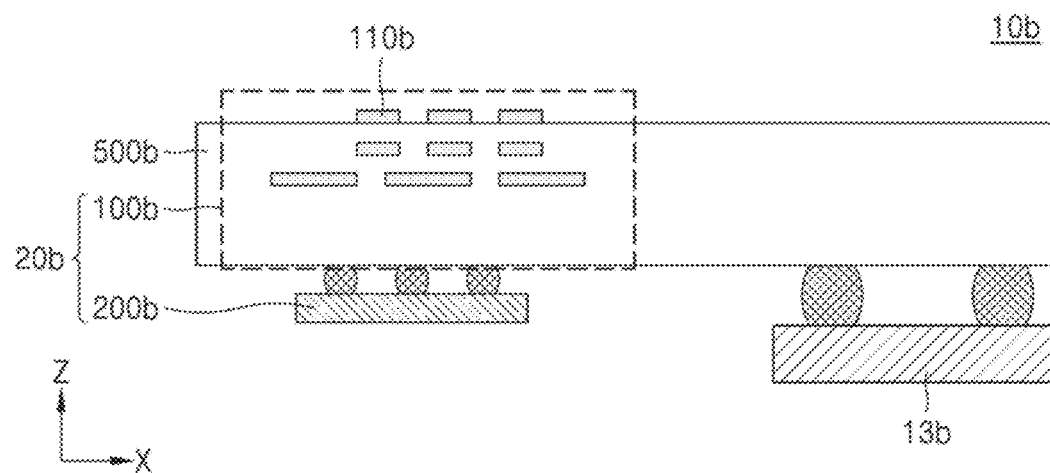
Figure 2C:
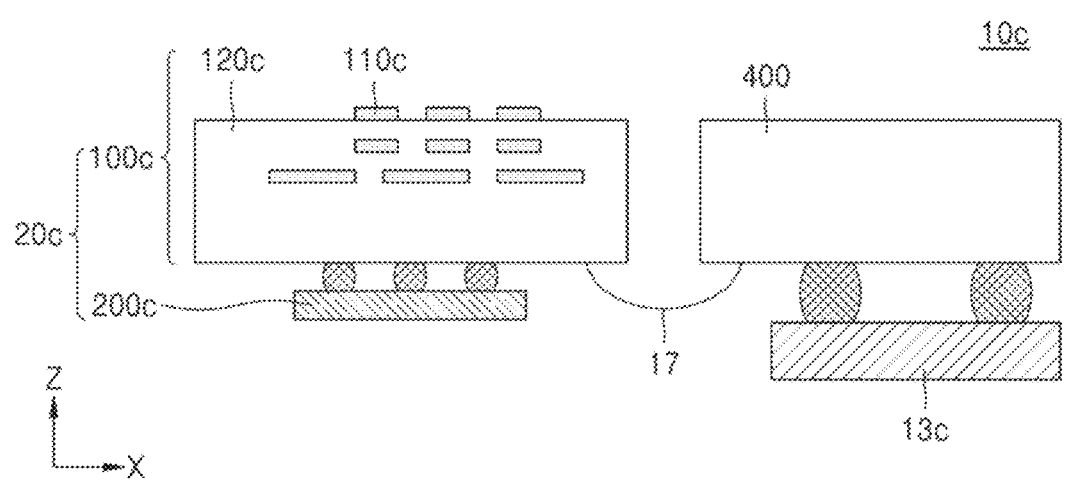

FIGS. 2A to 2C are diagrams showing examples of a layout of elements in the communication device 10 of FIG. 1, according to an embodiment. Hereinafter, FIGS. 2A to 2C will be described with reference to FIG. 1 and descriptions already given with respect to FIGS. 2A to 2C will be omitted. In the current specification, an X-axis direction and a Y-axis direction perpendicular to each other may be respectively referred to as a first horizontal direction and a second horizontal direction, and a plane including the X-axis and the Y-axis may be referred to as a horizontal plane. Also, an area may denote an area of a surface in parallel with the horizontal plane, and a direction perpendicular to the horizontal plane, that is, a Z-axis direction, may be referred to as a vertical direction. An element disposed in the +Z-axis direction as compared with another element may be considered to be located on another element, and an element disposed in the −Z-axis direction as compared with another element may be considered to be located under another element. Also, among surfaces of an element, a surface in the +Z-axis direction may be referred to as an upper surface of the element and a surface in the −Z-axis direction may be referred to as a lower surface of the element.

Since most of loss parameters may deteriorate in a high frequency band such as the mmWave frequency band, a layout of the antenna 100 and the RFIC 200 used in the low frequency band, e.g., 6 GHz or less, may not be used for the mmWave frequency band. For example, an antenna power feed structure used in the low frequency band may noticeably degrade an attenuation characteristic of the signal in the mmWave frequency band and an effective isotropic radiated power (EIRP) and noise figure may deteriorate overall. Accordingly, in order to reduce signal attenuation due to the power feed line 15 of FIG. 1, the antenna 100 and the RFIC 200 may be disposed close to each other. In particular, a high spatial efficiency may be required in a mobile application such as a mobile phone, and accordingly, as shown in FIG. 2C, a system-in-package (SiP) structure, in which the antenna 100 is disposed on the RFIC 200, may be adopted. Hereinafter, an example in which the RFIC 200 is implemented as an RFIC chip 200a, 200b, or 200c will be described below.

Referring to FIG. 2A, a communication device 10a may include an RF system 20a, a digital integrated circuit 13a, and a carrier board 500a, and the RF system 20a and the digital integrated circuit 13a may be mounted on an upper surface of the carrier board 500a. The RF system 20a and the digital integrated circuit 13a may be connected to communicate with each other via conductive patterns formed on the carrier board 500a. In some embodiments, the carrier board 500a may include a printed circuit board (PCB). The digital integrated circuit 13a may include the signal processor 300 of FIG. 1, and accordingly the digital integrated circuit 13a may transmit a transmission signal TX to the RFIC chip 200a or may receive a received signal RX from the RFIC chip 200a and may provide a control signal for controlling the RFIC chip 200a. In some embodiments, the digital integrated circuit 13a may include one or more cores and/or a memory and may control operations of the communication device 10a.

The RF system 20a may include an antenna module 100a and the RFIC chip 200a. The antenna module 100a may be referred to as an antenna package, and as shown in FIG. 2A, the antenna module 100a may include a substrate 120a and a conductor 110a formed on the substrate 120a.

For example, the antenna module 100a may include a ground plane that is in parallel with a horizontal plane and a plurality of antenna patches, as described later with reference to FIGS. 3A, 3B, and 4A, and may include a power feed line for supplying signals to the antenna patches from the RFIC chip 200a. The RFIC chip 200a may have an upper surface that is electrically connected to a lower surface of the antenna module 100a and may be referred to as a radio die. In some embodiments, the antenna module 100a and the RFIC chip 200a may be connected to each other via a controlled collapse chip connection (C4). The RF system 20a of FIG. 2A may easily dissipate heat and may have a stabilized structure.

However, one or more embodiments are not limited to the configuration of the antenna module 100a shown in FIG. 2A, that is, the antenna module 100a may include a plurality of substrates, and the antenna patches may be formed in metal layers disposed among the substrates of the antenna module 100a.

Referring to FIG. 2B, a communication device 10b may include an RFIC chip 200b, a digital integrated circuit 13b, and a carrier board 500b, and the RFIC chip 200b and the digital integrated circuit 13b may be mounted on a lower surface of the carrier board 500b. The RFIC chip 200b and the digital integrated circuit 13b may be connected to communicate with each other via conductive patterns formed on the carrier board 500b.

In the communication device 10b of FIG. 2B, the RF system 20b may include an antenna module 100b formed on the carrier board 500b and the RFIC chip 200b mounted on the lower surface of the carrier board 500b. As shown in FIG. 2B, the antenna module 100b may include a conductor 110b on the carrier board 500b and a power feed line, through which a signal is supplied from the RFIC chip 200b, on the carrier board 500b. According to the RF system 20b of FIG. 2B, a process of mounting the RF system 20b on the carrier board 500b may be omitted, and since a substrate for the antenna is omitted, a reduced height, that is, a reduced length in the Z-axis direction, may be obtained.

Referring to FIG. 2C, a communication device 10c may include an RF system 20c, a carrier board 400, and a digital integrated circuit 13c. As shown in FIG. 2C, the digital integrated circuit 13c may be mounted on a lower surface of the carrier board 400, and the RF system 20c and the carrier board 400 may be connected to communicate with each other via a jumper 17.

In the communication device 10c of FIG. 2C, the RF system 20c may include an antenna module 100c and an RFIC chip 200c mounted on a lower surface of the antenna module 100c. As shown in FIG. 2C, the antenna module 100c may include an antenna board 120c and a conductor 110c formed on the antenna board 120c, and a power feed line, through which a signal is supplied from the RFIC chip 200c, on the antenna board 120c. In the RF system 20c of FIG. 2C, a substrate for the antenna may be omitted, and the RF system 20c and the carrier board 400 may be manufactured independently from each other, and the communication device 10c may have an excellent productivity.

One or more embodiments will be described based on the RF system 20a shown in FIG. 2A, but descriptions provided below may be applied to RF systems having an arbitrary structure (e.g., a system-on-chip (SoC) structure) including an antenna module and an RFIC, as well as the examples shown in FIGS. 2B and 2C.

Figure 3A:
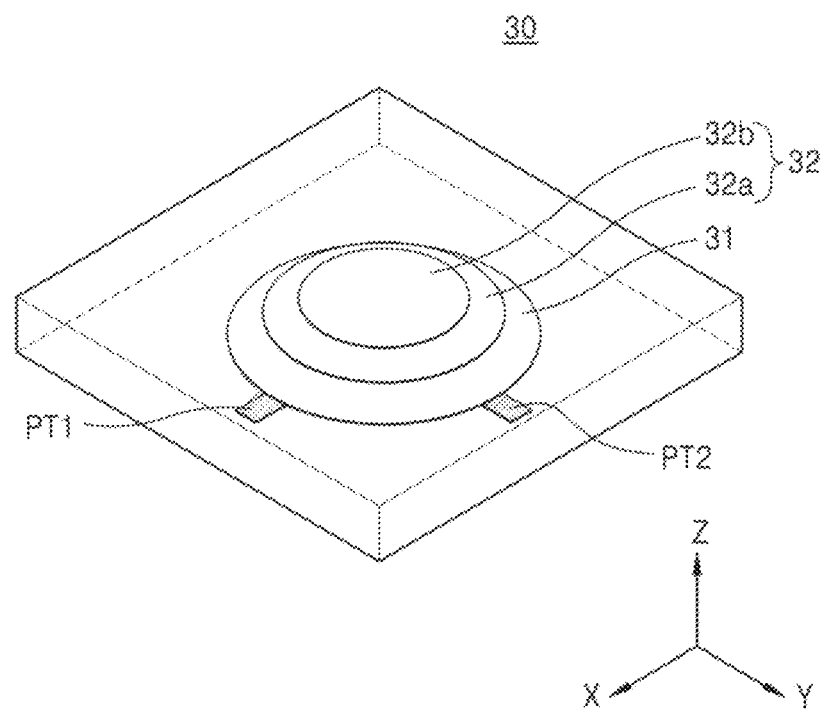
FIGS. 3A and 3B are perspective views of an antenna module according to an embodiment.
Figure 3B:
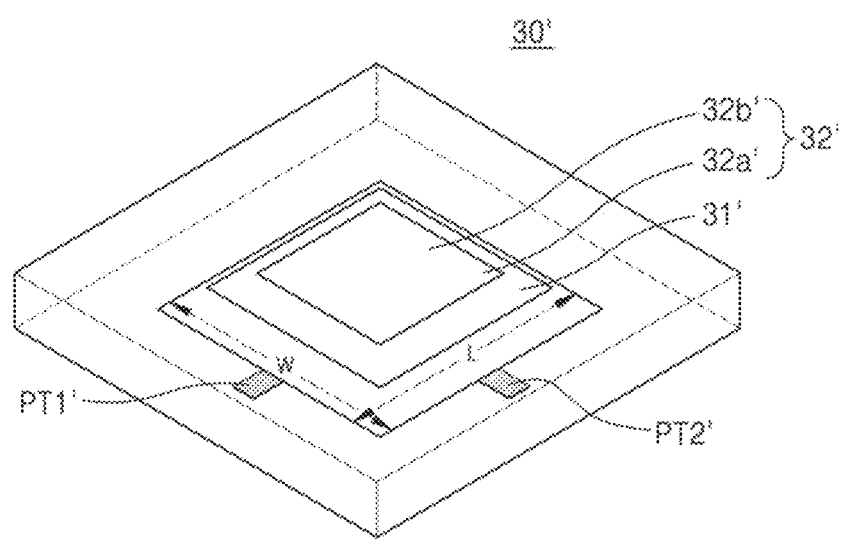

FIGS. 3A and 3B are perspective views of antenna modules 30 and 30', respectively, according to an embodiment. FIGS. 3A and 3B show the antenna modules 30 and 30' as examples including antenna patches of a 3-stack structure and illustrate only some elements in the antenna modules 30 and 30' for convenience of description.

Referring to FIG. 3A, the antenna module 30 may include a first antenna patch 31, a second antenna patch 32a, and a third antenna patch 32b that are disposed in parallel and spaced apart from one another in the Z-axis direction. The first antenna patch 31 may transmit/receive an RF signal of a first frequency band, and the second antenna patch 32a and the third antenna patch 32b may transmit/receive an RF signal of a second frequency band. For example, the first frequency band may denote a low frequency band and the second frequency band may denote an RF band. The first to third antenna patches 31, 32a, and 32b may include a conductive material such as metal and may each have a circular shape.

A radius of each of the first to third antenna patches 31, 32a, and 32b, intervals among the first to third antenna patches 31, 32a, and 32b, dielectric constants among the first to third antenna patches 31, 32a, and 32b may be variable according to a location on a frequency axis in the first frequency band, in which the first antenna patch 31 operates, and a location on a frequency axis in the second frequency band, in which the second and third antenna patches 32a and 32b operate.

According to an embodiment, the antenna module 30 may support RF signal transmission/reception in two frequency bands among a plurality of frequency bands for the mmWave data communication designated by the 3rd generation partnership project (3GPP), which defines the standard of a 5G (or new radio (NR)) system. Here, the first to third antenna patches 31, 32a, and 32b may have different radii from one another, for example, the radius may decrease in an order of the first antenna patch 31, the second antenna patch 32a, and the third antenna patch 32b. That is, as shown in FIG. 3A, a first radius of the first antenna patch 31 may be greater than a second radius of the second antenna patch 32A, and the second radius of the second antenna patch 32a may be greater than a third radius of the third antenna patch 32b. Also, a dielectric constant among the first to third antenna patches 31, 32a, and 32b may be constant (e.g., a dielectric constant between the first and second antenna patches 31 and 32a may be the same as a dielectric constant between the second and third antenna patches 32a and 32b), and intervals among the first to third antenna patches 31, 32a, and 32b may be equal to each other. However, one or more embodiments are not limited thereto and the first to third antenna patches 31, 32a, and 32b may be variously configured according to the plurality of frequency bands supported by the antenna module 30. The third antenna patch 32b may be omitted in some embodiments and an example of a specific embodiment in which the third antenna patch 32b is omitted will be described later with reference to FIG. 10, etc.

The antenna module 30 may include a first port PT1 connected to the first antenna patch 31 and a second port PT2 connected to the second antenna patch 32a. The first port PT1 and the second port PT2 may respectively include power feed lines for supplying signals respectively to the first antenna patch 31 and the second antenna patch 32a. In some embodiments, the first antenna patch 31 may receive a signal from a power feed point of the first antenna patch 31 via the first port PT1 and be excited by the signal to radiate electromagnetic waves corresponding to the first frequency band. The second antenna patch 32a may receive a signal supplied from a power feed point of the second antenna patch 32a via the second port PT2 and be excited by the signal to radiate electromagnetic waves corresponding to the second frequency band. Also, the third antenna patch 32b may be coupled to the second antenna patch 32a that is excited, in order to radiate electromagnetic waves corresponding to the second frequency band.

In some embodiments, the power feed line of the second port PT2 may penetrate through the first antenna patch 31 to be connected to the power feed point of the second antenna patch 32a. A point of the first antenna patch 31, through which the power feed line of the second port PT2 penetrates, may be defined as a penetration point that may be formed within a region of the first antenna patch 31, wherein the region may reduce influence on the radiation of the electromagnetic waves corresponding to the first frequency band from the first antenna patch 31.

Referring to FIG. 3B, the antenna module 30' may include a first antenna patch 31', a second antenna patch 32a', and a third antenna patch 32b' that are disposed in parallel and spaced apart from one another in the Z-axis direction, and as compared with FIG. 3A, the first to third antenna patches 31', 32a', and 32b' may each have a rectangular shape including two pairs of sides in parallel with each other. The antenna module 30' may further include a first port PT1' connected to the first antenna patch 31' and a second port PT2' connected to the second antenna patch 32a'.

A width W and a length L of each of the first to third antenna patches 31', 32a', and 32b', intervals among the first to third antenna patches 31', 32a', and 32b', dielectric constants among the first to third antenna patches 31', 32a', and 32b' may be variable according to a location on a frequency axis in the first frequency band, in which the first antenna patch 31' operates, and a location on a frequency axis in the second frequency band, in which the second and third antenna patches 32a' and 32b' operate. Configurations of the first to third antenna patches 31', 32a', and 32b' are described above with reference to FIG. 3A, and thus detailed descriptions thereof are omitted. However, one or more embodiments are not limited to the examples of the first antenna patches 31, 31', the second antenna patches 32a, 32a', and the third antenna patches 32b, 32b' shown in FIGS. 3A and 3B, and antenna patches for supporting the multi-band may be implemented in various shapes. Hereinafter, descriptions about the configuration of the antenna module 30 of FIG. 3A will be provided as an example, but one or more embodiments are not limited thereto.

Figure 4:
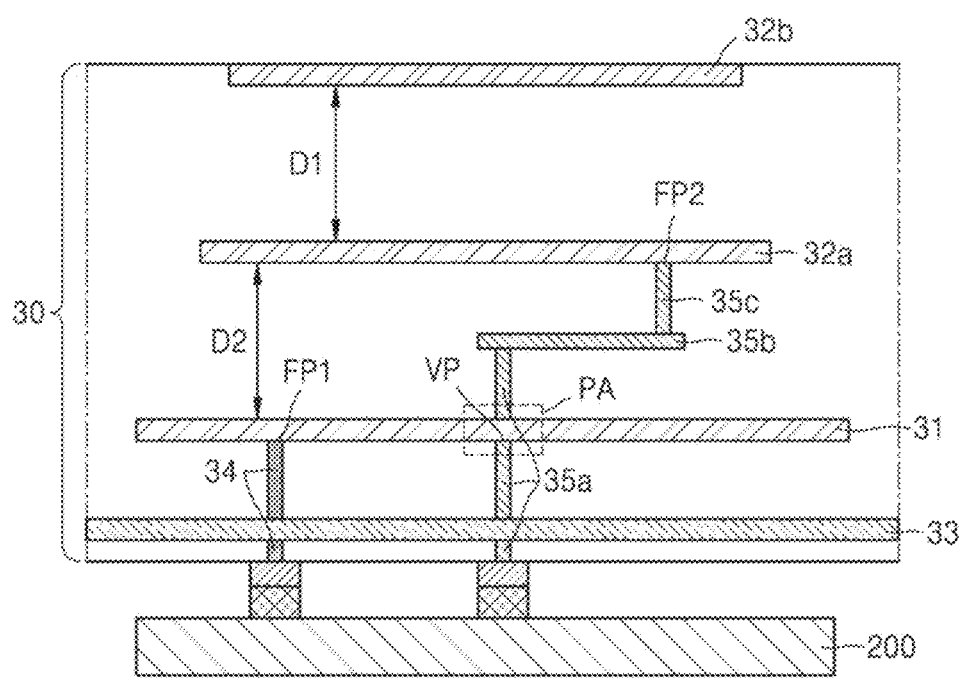
FIG. 4 is a side view of a radio frequency (RF) system including the antenna module of FIG. 3A, the RF system being seen in a Y-axis direction, according to an embodiment.

FIG. 4 is a side view of a radio frequency (RF) system including the antenna module 30 of FIG. 3A, the RF system being seen in a Y-axis direction, according to an embodiment. For convenience of description, FIG. 4 shows only some of the elements included in the antenna module 30. Hereinafter, the power feed lines 35a, 3b, and 35c may collectively be referred to as a second power feed line 35. The antenna module 30 may include a first antenna patch 31, a second antenna patch 32a, a ground plate 33, a first power feed line 34, and a second power feed line 35.

Referring to FIGS. 3A and 4, an RFIC 200 may be mounted on a lower surface of the antenna module 30. The first port PT1 may include a first power feed line 34 and the second port PT2 may include a second power feed line 35. The first power feed line 34 and the second power feed line 35 may penetrate through the ground plate 33. The RFIC 200 provides a signal to a first power feed point FP1 of the first antenna patch 31 via the first power feed line 34 of the first port PT1 and provides a signal to a second power feed point FP2 of the second antenna patch 32a via the second power feed line 35 of the second port PT2. A location of the first power feed point FP1 of the first antenna patch 31 and a location of the second power feed point FP2 of the second antenna patch 32a may be determined by impedance matching.

As described above, the first antenna patch 31 may radiate electromagnetic waves for transmitting/receiving an RF signal of the first frequency band, and the second and third antenna patches 32a and 32b may radiate electromagnetic waves for transmitting/receiving an RF signal of the second frequency band.

In some embodiments, the second power feed line 35 may be connected to the second antenna patch 32a after penetrating through the first antenna patch 31, in order to implement miniaturization of the antenna module 30 to be suitable for the mmWave data communication. For the above connecting configuration, the first antenna patch 31 may include a penetration point VP within a region PA. The region PA may be predetermined. The region PA may be defined as a region that may least affect electromagnetic waves radiated by the first antenna patch 31 based on the signal transmitted from the first power feed point FP1, and detailed descriptions thereof will be provided later with reference to FIGS. 5A and 5B.

The second power feed line 35 may include a first vertical power feed line 35a provided vertically to pass through the penetration point VP, a horizontal power feed line 3b provided horizontally in a direction towards the second power feed point FP2, and a second vertical power feed line 35c connected to the horizontal power feed line 3b and provided horizontally to be connected to the second power feed point FP2.

Although not shown in detail in FIG. 4, the antenna module 30 may further include a first substrate between the first antenna patch 31 and the second antenna patch 32a, and a second substrate between the second antenna patch 32a and the third antenna patch 32b. As described above, a radius of each of the first to third antenna patches 31, 32a, and 32b, intervals D1 and D2 among the first to third antenna patches 31, 32a, and 32b, dielectric constants of the first and second substrates among the first to third antenna patches 31, 32a, and 32b may be variable according to a location on a frequency axis in the first frequency band, in which the first antenna patch 31 operates, and a location on a frequency axis in the second frequency band, in which the second and third antenna patches 32a and 32b operate.

As shown in FIG. 4, a radius decreases in an order of the first antenna patch 31, the second antenna patch 32a, and the third antenna patch 32b in some embodiments. Also, the dielectric constants of the first substrate and the second substrate among the first to third antenna patches 31, 32a, and 32b, and distances D1 and D2 among the first to third antenna patches 31, 32a, and 32b may be equal to each other. However, one or more embodiments are not limited thereto and the first to third antenna patches 31, 32a, and 32b may be variously configured according to the plurality of frequency bands supported by the antenna module 30.

Figure 5A:
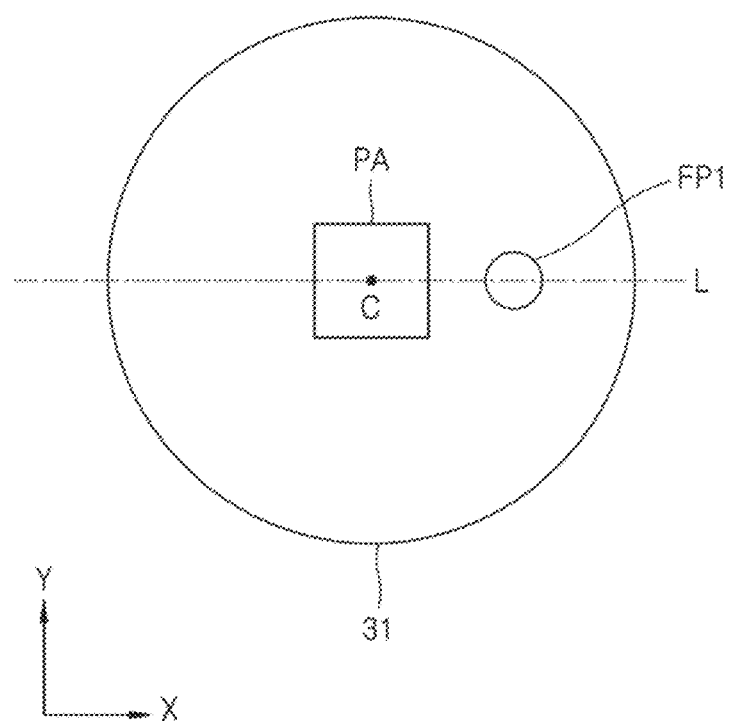
FIGS. 5A and 5B are diagrams illustrating a region PA where a penetration point of FIG. 4 is formed.
Figure 5B:
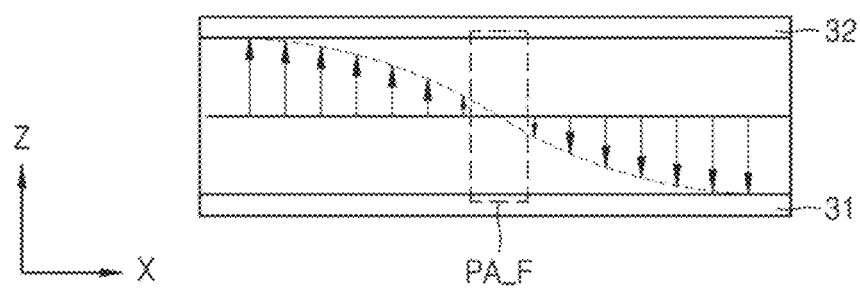

FIGS. 5A and 5B are diagrams illustrating the region PA where the penetration point VP of FIG. 4 is formed.

Referring to FIG. 5A, the first antenna patch 31 may include the first power feed point FP1 adjacent to a line L that crosses over a center C of the first antenna patch 31. The penetration point VP (see FIG. 4) may be formed within the region PA (or a center region) including boundaries that are apart a distance from the center C of the first antenna patch 31. Although not shown in the drawings, the second power feed point may be formed in the second antenna patch 32a similarly to the first power feed point FP1. FIG. 5B is a diagram showing the first antenna patch 31 of FIG. 5A and an electric field formed by the first antenna patch 31. The electric field shown in FIG. 5B may be a part of electromagnetic waves radiated by the first antenna patch 31.

Referring to FIG. 5B, the first antenna patch 31 may generate an electric field having opposite phases at opposite ends thereof based on an axis in parallel with the X-axis, by using the signal supplied from the first power feed point FP1 of the first patch antenna 31. An electric field PA_F corresponding to the region PA of the first patch antenna 31 may have an intensity that is equal to or less than a reference value. The reference value may be predetermined. When the penetration point VP (see FIG. 4) is formed in the region PA, influence of the second power feed line 35 (see FIG. 4) passing through the penetration point VP (see FIG. 4) on the electric field generated by the first patch antenna 31 may be reduced.

Figure 6:
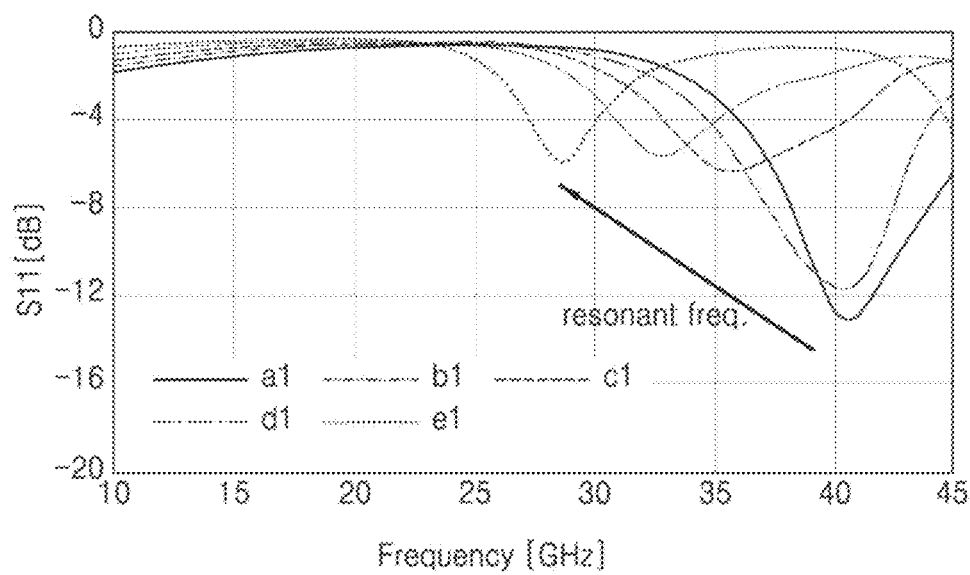
FIG. 6 is a graph showing S-parameters versus frequency according to a radius of a first antenna patch shown in FIG. 4.
Figure 7:
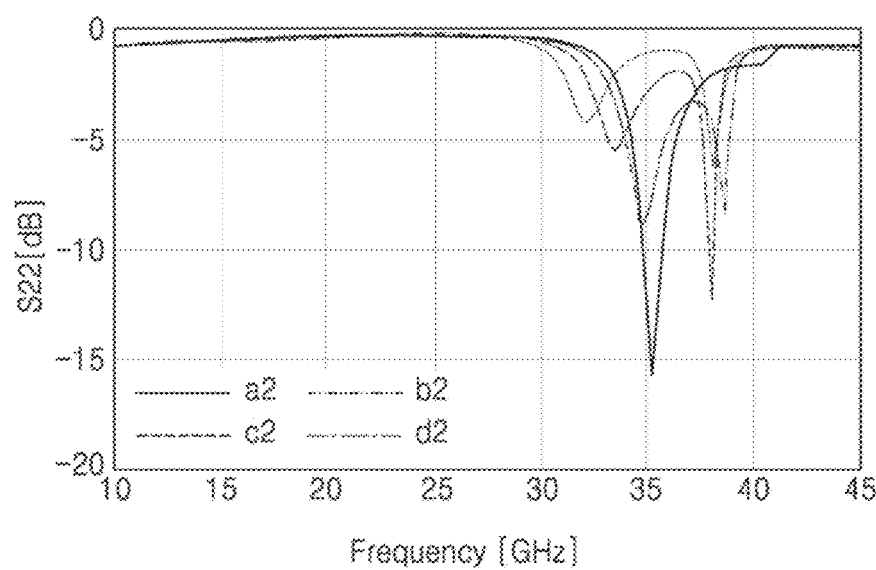
FIG. 7 is a graph showing S-parameters versus frequency according to a radius of a second antenna patch shown in FIG. 4.
Figure 8:
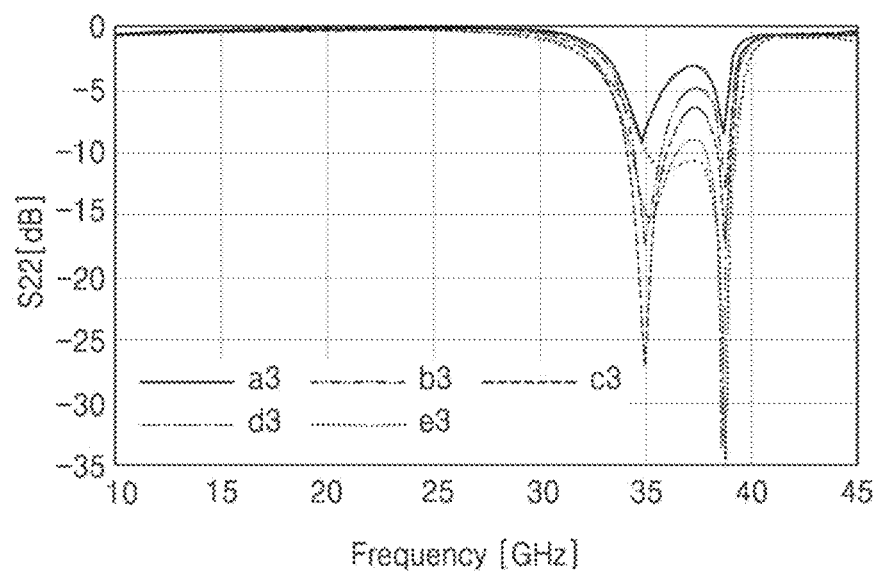
FIG. 8 is a graph showing S-parameters versus frequency according to a length of a second power feed line of a second antenna patch shown in FIG. 4.

FIG. 6 is a graph showing S-parameter (S11) versus frequency, according to the radius of the first antenna patch 31 of FIG. 4, FIG. 7 is a graph showing S-parameter (S22) versus frequency, according to the radius of the second antenna patch 32a of FIG. 4, and FIG. 8 is a graph showing S-parameter (S22) versus frequency, according to a length of the second power feed line 35 of the second antenna patch 32a of FIG. 4. The S-parameter denotes an input reflection coefficient of an antenna patch, and a frequency band suitable for the operation of the antenna patch may be determined according to the S-parameter.

Referring to FIG. 6, when the radius of the first antenna patch 31 (see FIG. 4) changes from a first length to a fifth length (a1 to e1), the S-parameter S11 of the first antenna patch 31 may be changed. For example, when the radius of the first antenna patch 31 (see FIG. 4) is the fifth length e1, the first antenna patch 31 is suitable to operate in a lowest frequency band, and when the radius is the first length a1, the first antenna patch 31 may be suitable to operate in a highest frequency band. As an example, when it is determined that the first antenna patch 31 (see FIG. 4) operates in a first frequency band according to the standard defined by 3GPP, the radius of the first antenna patch 31 (see FIG. 4) may be determined so that the first antenna patch 31 may operate in the first frequency band.

Referring to FIG. 7, when the radius of the second antenna patch 32a (see FIG. 4) changes from a first length to a fourth length (a2 to d2), the S-parameter S22 of the second antenna patch 32a may be changed. As an example, when it is determined that the second antenna patch 32a (see FIG. 4) operates in a second frequency band according to the standard defined by the 3GPP, the radius of the second antenna patch 32a (see FIG. 4) may be determined so that the second antenna patch 32a may operate in the second frequency band.

Referring to FIG. 8, when the length of the second power feed line 35 (see FIG. 4) connected to the second antenna patch 32a (see FIG. 4) is changed from a first length to a fifth length (a3 to e3), the S-parameter S22 of the second antenna patch 32a may be changed. The length of the second power feed line 35 (see FIG. 4) is changed after determining the radius of the second antenna patch 32a (see FIG. 4), and thus the length of the second power feed line 35 (see FIG. 4) may be determined to allow the second antenna patch 32a to operate in the second frequency band with a highest performance (e.g., with excellent input reflection coefficient).

That is, the length of the radius of the first antenna patch 31 (see FIG. 4), the length of the radius of the second antenna patch 32a (see FIG. 4), and the length of the second power feed line 35 (see FIG. 4) may be determined according to the frequency bands that the antenna module 30 (see FIG. 4) according to the embodiment may support. Although not described herein, the length of the radius of the third antenna patch 32b (see FIG. 4) and a distance between the third antenna patch 32b and the second antenna patch 32a (see FIG. 4) may be determined to make a condition for best coupling with the second antenna patch 32a.

Figure 9:
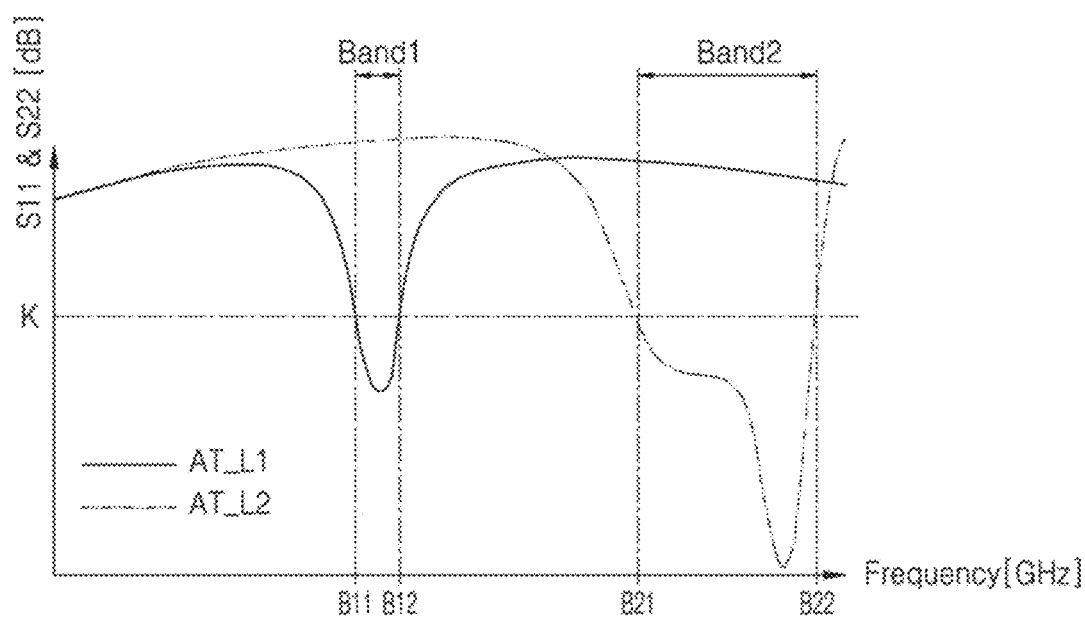
FIG. 9 is a graph illustrating frequency bands in which the antenna module of FIG. 4 operates.

FIG. 9 is a graph illustrating frequency bands in which the antenna module of FIG. 4 operates.

Referring to FIG. 9, the antenna module 30 (see FIG. 4) may operate in a first frequency band Band1 between a frequency B11 and a frequency B12, and in a second frequency band Band2 between a frequency B21 and a frequency B22. That is, the antenna module 30 (see FIG. 4) may transmit/receive an RF signal of the first frequency band Band1 and at the same time may transmit/receive an RF signal of the second frequency band Band2. The first frequency band Band1 and the second frequency band Band2 may be included in frequency bands for the mmWave data communication designated by 3GPP. In detail, a first line AT_L1 corresponds to characteristics of the first antenna patch 31 (see FIG. 4) and a second line AT_L2 corresponds to characteristics of the second antenna patch 32a (see FIG. 4) and the third antenna patch 32b (see FIG. 4). The first antenna patch 31 (see FIG. 4) may be configured so that the S-parameter S11 is equal to or less than a first reference value K in the first frequency band Band1, and the second and third antenna patches 32a and 32b (see FIG. 4) may be configured so that the S-parameter S22 thereof is equal to or less than a second reference value K in the second frequency band Band2.

Figure 10:
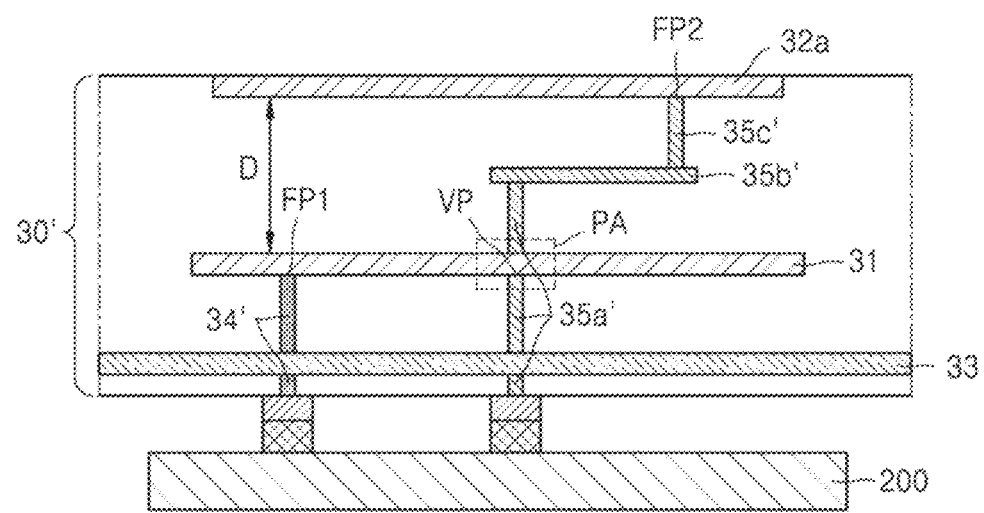
FIG. 10 is a side view of an RF system including an antenna module, the RF system being seen in a Y-axis direction, according to an embodiment.

FIG. 10 is a side view of an RF system including an antenna module 30', the RF system being seen in a Y-axis direction, according to an embodiment. For convenience of description, FIG. 10 shows only some of the elements included in the antenna module 30'. The antenna module 30' of FIG. 10 has a structure from which the third antenna patch 32b of the antenna module 30 shown in FIG. 4 is omitted. Hereinafter, power feed lines 35a', 3b', and 35c' may collectively be referred to as a second power feed line 35'.

Referring to FIG. 10, the antenna module 30' may include the first antenna patch 31, the second antenna patch 32a, a ground plate 33, a first power feed line 34, and a second power feed line 35. The antenna module 30' is the same as the antenna module 30 of FIG. 4 except that the third antenna patch 32b is omitted, and thus detailed descriptions about the same elements as those of the antenna module 30 will be omitted.

The first antenna patch 31 may radiate electromagnetic waves for transmitting/receiving an RF signal of a first frequency band, and the second antenna patch 32a may radiate electromagnetic waves for transmitting/receiving an RF signal of a second frequency band. Since the antenna module 30' does not include the third antenna patch 32b, the antenna module 30' may be smaller than the antenna module 30 of FIG. 4.

Figure 11A:
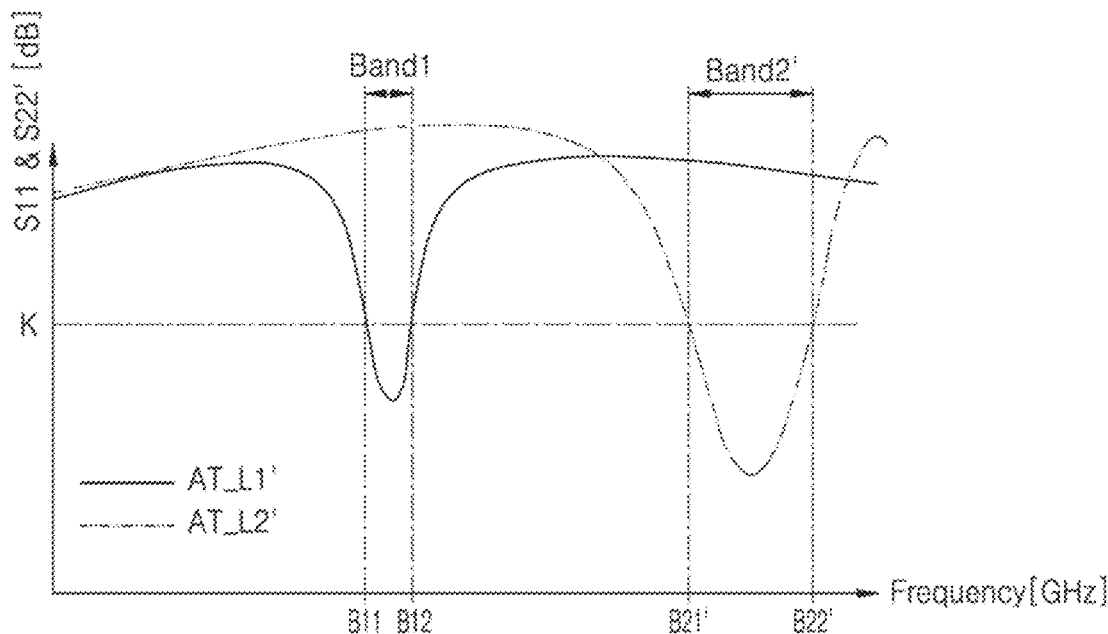
FIGS. 11A and 11B are graphs illustrating frequency bands in which the antenna module of FIG. 10 operates.
Figure 11B:
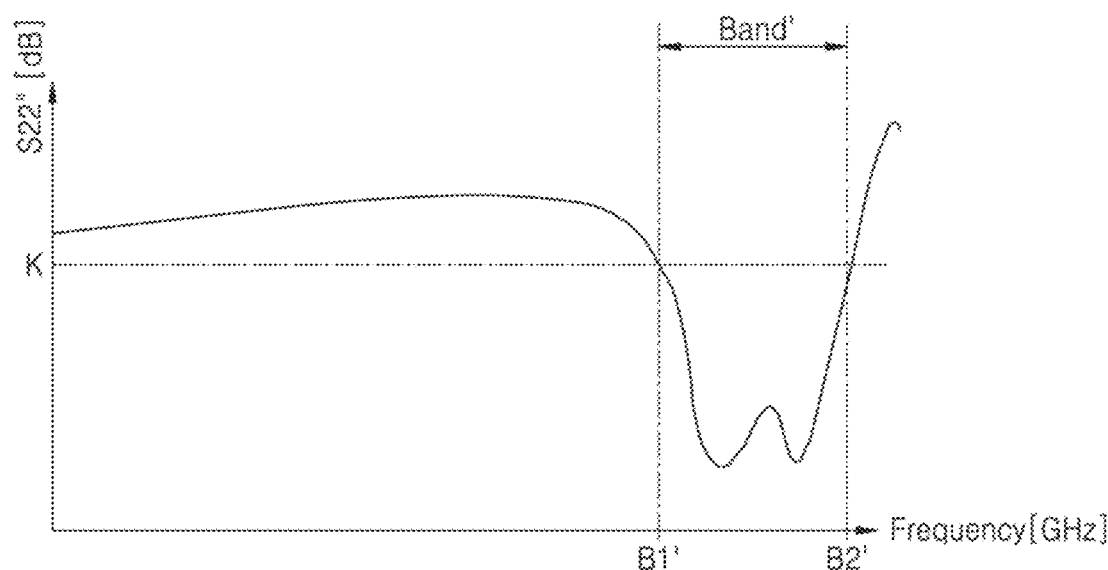

FIGS. 11A and 11B are graphs illustrating frequency bands in which the antenna module 30' of FIG. 10 operates.

Referring to FIG. 11A, the antenna module 30' (see FIG. 10) may operate in the first frequency band Band1 between the frequency B11 and the frequency B12, and in a second frequency band Band2' between a frequency B21' and a frequency B22'. The second frequency band Band2' may be different from the second frequency band Band2 of FIG. 9. That is, the antenna module 30 (see FIG. 4) may transmit/receive an RF signal of the first frequency band Band1 and at the same time may transmit/receive an RF signal of the second frequency band Band2'. The first frequency band Band1 and the second frequency band Band2' may be included in frequency bands for the mmWave data communication designated by 3GPP. In detail, a first line AT_L1' corresponds to characteristics of the first antenna patch 31 (see FIG. 10) and a second line AT_L2' corresponds to characteristics of the second antenna patch 32a (see FIG. 10). The first antenna patch 31 (see FIG. 10) may be configured so that the S-parameter S11 is equal to or less than a first reference value K in the first frequency band Band1, and the second antenna patch 32a (see FIG. 10) may be configured so that the S-parameter S22 thereof may be equal to or less than a third reference value K in the second frequency band Band2'.

Referring to FIG. 11B, unlike in FIG. 11A, the antenna module 30' (see FIG. 10) may operate in a frequency band Band' between a frequency BF and a frequency B2'. That is, the antenna module 30' (see FIG. 10) may transmit/receive an RF signal of one frequency band Band', the frequency band Band' may have a bandwidth that is equal to or greater than a reference width, and the antenna module 30' (see FIG. 10) may transmit/receive signals having various frequency spectrums in the mmWave data communication. The reference width may be predetermined. The first antenna patch 31 (see FIG. 10) and the second antenna patch 32a (see FIG. 10) may be configured so that an S-parameter S22" may be equal to or less than a fourth reference value K in the frequency band Band', and a way of supplying the signal to the antenna module 30' through the first and second power feed lines 34 and 35 (see FIG. 10) in FIG. 11A may be different from a way of supplying the signal to the antenna module 30' (see FIG. 10) via the power feed lines 35 and 35 in FIG. 11B.

Figure 12:
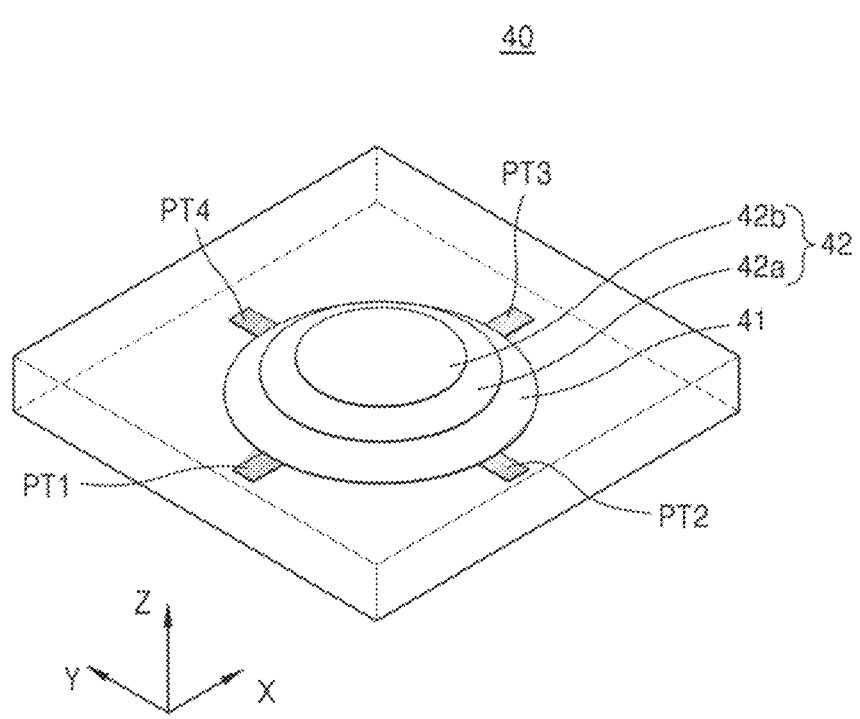
FIG. 12 is a perspective view of an antenna module according to an embodiment.

FIG. 12 is a perspective view of an antenna module according to an embodiment. FIG. 12 shows an antenna module 40 as an example including antenna patches of a 3-stack structure and illustrates only some elements in the antenna module 40 for convenience of description. The antenna module 40 of FIG. 12 may support dual-polarization radiation and may be referred to as a dual-fed patch antenna. The antenna module 40 of FIG. 12 may further include a third port PT3 and a fourth port PT4 as compared with the antenna module 30 of FIG. 4 and descriptions about the same elements as those of the antenna module 30 of FIG. 4 will be omitted.

Referring to FIG. 12, the antenna module 40 may include a first antenna patch 41, a second antenna patch 42a, and a third antenna patch 42b that are disposed in parallel and spaced apart from one another in the Z-axis direction. The first antenna patch 41 may transmit/receive an RF signal of a first frequency band, and the second antenna patch 42a and the third antenna patch 42b may transmit/receive an RF signal of a second frequency band.

The antenna module 40 may include the first port PT1 and the third port PT3 connected to the first antenna patch 41, and the second port PT2 and the fourth port PT4 connected to the second antenna patch 42a, in order to support dual-polarization radiation. The first port PT1 and the third port PT3 may include power feed lines for supplying signals to the first antenna patch 41, and the second port PT2 and the fourth port PT4 may include power feed lines for supplying signals to the second antenna patch 42a. The first antenna patch 41 may provide dual-polarization based on the first port PT1 and the third port PT3 that are spaced apart from each other in the X-axis direction, and the second antenna patch 42a may provide dual-polarization based on the second port PT2 and the fourth port PT4 that are spaced apart from each other in the Y-axis direction. For the dual-polarization, the first antenna patch 41 and the second antenna patch 42a may respectively include two power feed points. Also, the first antenna patch 41 may include two penetration points, through which the power feed lines connected to the second antenna patch 42a may pass. However, one or more embodiments are not limited thereto, that is, the antenna module 40 may be configured to be suitable for the multiple power feed types.

Figure 13A:
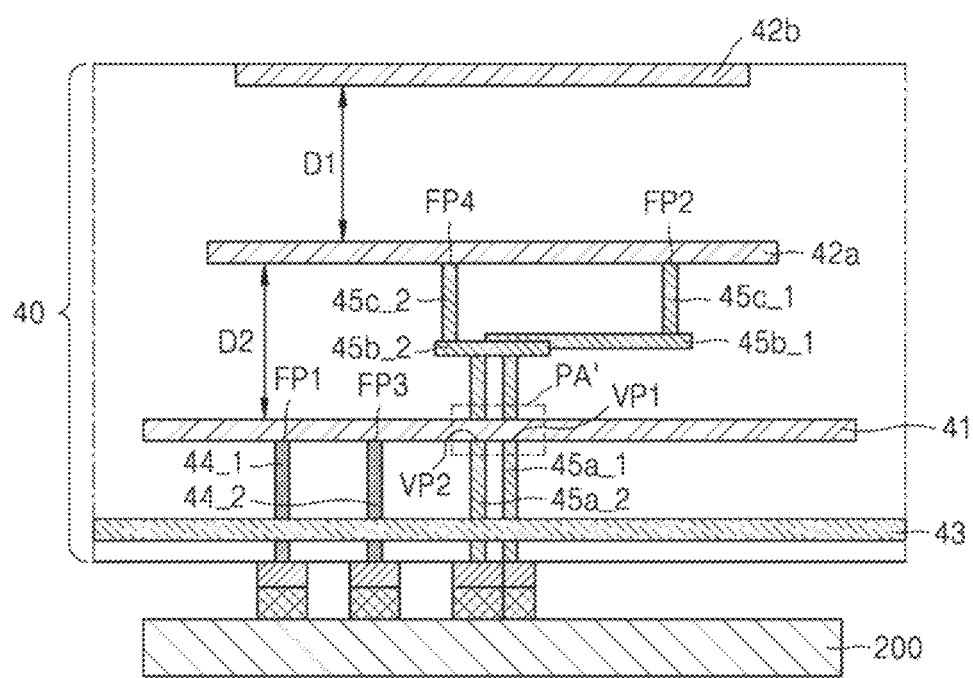
FIG. 13A is a side view of an RF system including an antenna module of FIG. 12 seen in a Y-axis direction according to an embodiment.
Figure 13B:
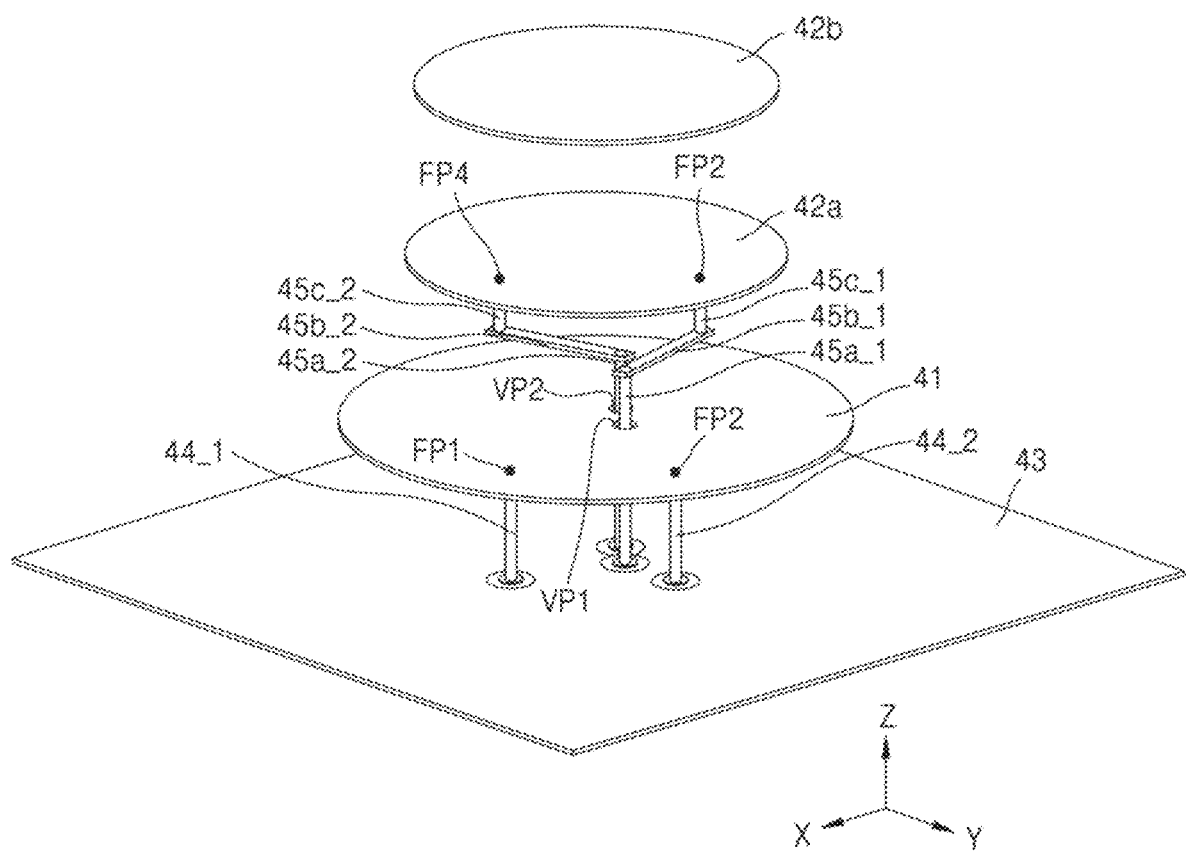
FIG. 13B is a perspective view of the antenna module of FIG. 13A.

FIG. 13A is a side view of an RF system including the antenna module of FIG. 12 seen in a Y-axis direction according to an embodiment, and FIG. 13B is a perspective view of the antenna module of FIG. 13A. For convenience of description, FIGS. 13A and 13B show only some of the elements included in the antenna module 40. Hereinafter, power feed lines 45a_, 45b_1, and 45c_1 may collectively be referred to as a second power feed line 45_1, and lower feed line 45a_2, 45b_2, and 45c_2 may collectively be referred to as a fourth power feed line 45_2. The antenna module 40 may include a first antenna patch 41, a second antenna patch 42a, a ground plate 43, a first power feed line 44_1, third power feed line 44_2, and the second power feed line 45_1, and the fourth power feed line 45_2.

Referring to FIGS. 12 and 13A, an RFIC 200 may be mounted on a lower surface of the antenna module 40. The first port PT1 connected to the first antenna patch 41 includes the first power feed line 44_1, and the third port PT3 includes the third power feed line 44_2. The second port PT2 connected to the second antenna patch 42a includes the second power feed line 45_1, and the fourth port PT4 includes the fourth power feed line 45_2.

The RFIC 200 may provide a first differential signal to the first power feed point FP1 and the third power feed point FP3 of the first antenna patch 41 via the first power feed line 44_1 of the first port PT1 and the third power feed line 44_2 of the third port PT3. The first differential signal may include a first signal provided to the first power feed point FP1 and a second signal having an opposite phase to that of the first signal and provided to the third power feed point FP3. Locations of the first power feed point FP1 and the third power feed point FP3 of the first antenna patch 41 may be determined by impedance matching. The RFIC 200 may provide a second differential signal to the second power feed point FP2 and the fourth power feed point FP4 of the second antenna patch 42a via the second power feed line 45_1 of the second port PT2 and the fourth power feed line 45_2 of the fourth port PT4. The second differential signal may include a third signal provided to the second power feed point FP2 and a fourth signal having an opposite phase to that of the third signal and provided to the fourth power feed point FP4. Locations of the second power feed point FP2 and the fourth power feed point FP4 of the second antenna patch 42a may be determined by impedance matching.

In some embodiments, the second power feed line 45_1 and the fourth power feed line 45_2 may be connected to the second antenna patch 42a after penetrating through the first antenna patch 41 in order to miniaturize the antenna module 40. For the connecting configuration, the first antenna patch 41 may include first and second penetration points VP1 and VP2 within a region PA'. The region PA' may be predetermined. The second power feed line 45_1 may include a first vertical power feed line 45a_1 formed vertically to penetrate through the first penetration point VP1, a first horizontal power feed line 45b_1 connected to the first vertical power feed line 45a_1 and formed horizontally towards the second power feed point FP2, and a second vertical power feed line 45c_1 connected to the first horizontal power feed line 45b_1 and formed horizontally to be connected to the second power feed point FP2. The fourth power feed line 45_2 may include a third vertical power feed line 45b_1 formed vertically to penetrate through the second penetration point VP2, a second horizontal power feed line 45b_2 connected to the third vertical power feed line 45b_1 and formed horizontally towards the fourth power feed point FP4, and a fourth vertical power feed line 45c_2 connected to the second horizontal power feed line 45b_2 and formed vertically to be connected to the fourth power feed point FP4.

According to the above structure, the first antenna patch 41 may radiate dual-polarization electromagnetic waves for transmitting/receiving the RF signal of the first frequency band, and the second antenna patch 42a and the third antenna patch 42b may radiate dual-polarization electromagnetic waves for transmitting/receiving the RF signal of the second frequency band.

Referring to FIG. 13B, In some embodiments, the first vertical power feed line 45a_1 and a third vertical power feed line 45a_2 may have the same length as each other, and the second vertical power feed line 45c_1 and the fourth vertical power feed line 45c_2 may have the same length as each other. The first horizontal power feed line 45b_1 and the second horizontal power feed line 45b_2 may be disposed with an angle therebetween. The angle may be predetermined. The first horizontal power feed line 45b_1 and the second horizontal power feed line 45b_2 may be disposed with an angle of 90°. In other embodiments, the first vertical power feed line 45a_1 and the third vertical power feed line 45a_2 may have different lengths from each other, and the second vertical power feed line 45c_1 and the fourth vertical power feed line 45c_2 may have different lengths from each other. However, one or more embodiments are not limited thereto, that is, the second power feed line 45_1 and the fourth power feed line 45_2 may have various lengths according to locations of the second and fourth power feed points FP2 and FP4 and locations of the first and second penetration points VP1 and VP2.

Figure 14A:
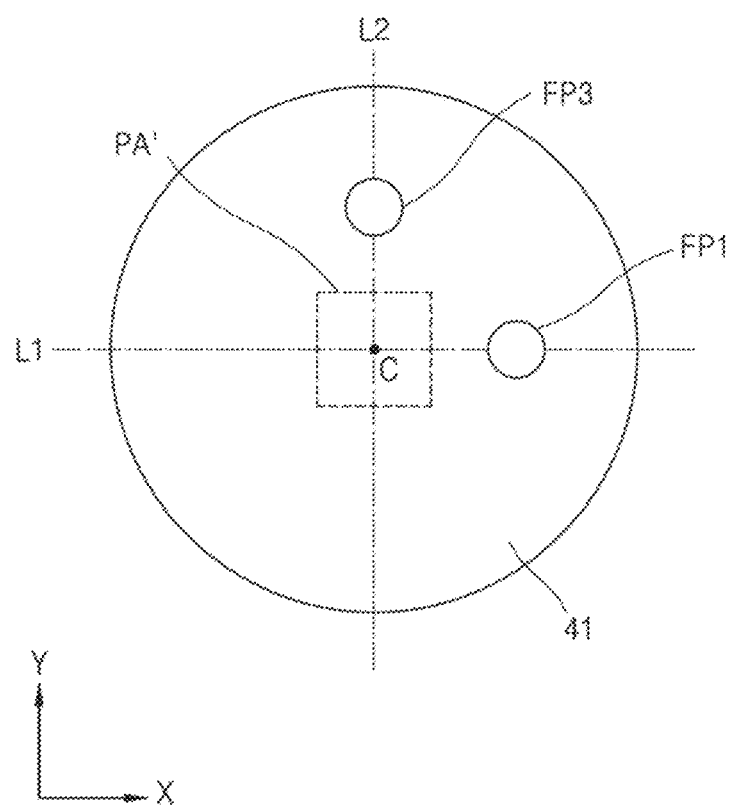
FIGS. 14A to 14C are diagrams illustrating a region where a penetration point of FIG. 13A is formed.
Figure 14B:
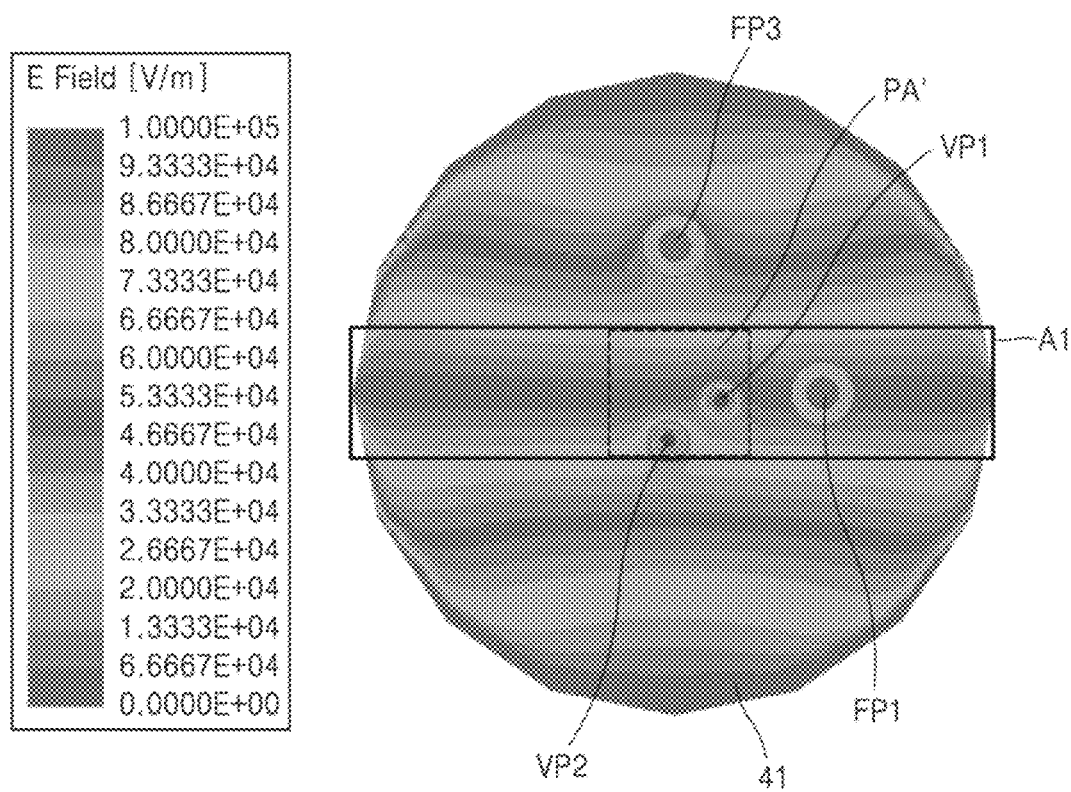
Figure 14C:
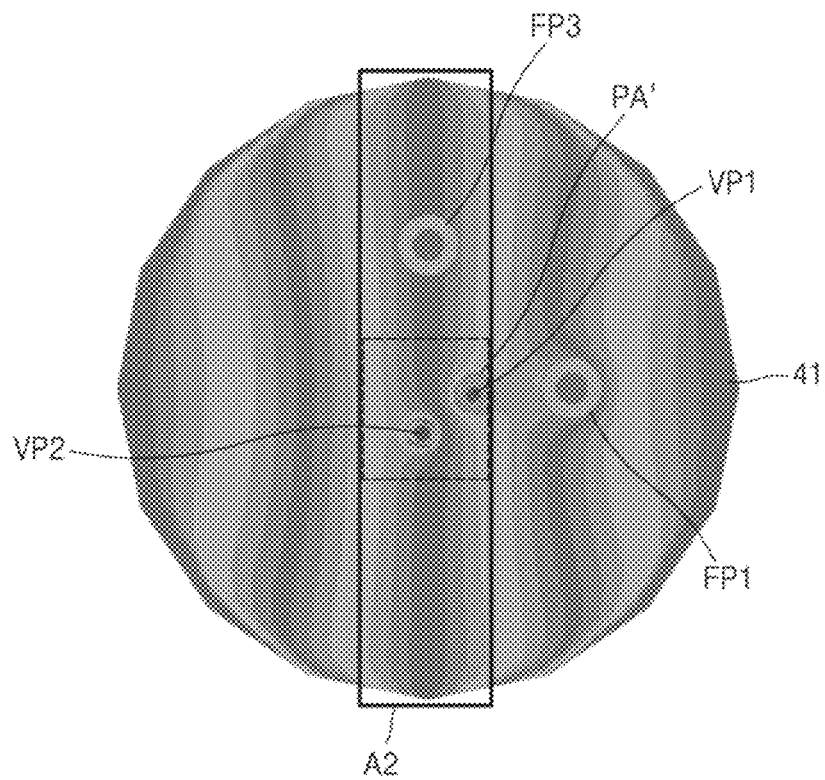

FIGS. 14A to 14C are diagrams illustrating a region where first and second penetration points VP1 and VP2 of FIG. 13A are formed.

Referring to FIG. 14A, the first antenna patch 41 may include the first power feed point FP1 adjacent to a first line L1 crossing over the center C of the first antenna patch 41, and the third power feed point FP3 adjacent to a second line L2 perpendicular to the first line L1 and crossing over the center C of the first antenna patch 41. Also, the first power feed point FP1 and the third power feed point FP3 may be formed in the first antenna patch to be spaced a same distance from the center C of the first antenna patch 41. Although not shown in the drawings, the second power feed point and the fourth power feed point may be formed in the second antenna patch similarly to the first power feed point FP1 and the third power feed point FP3.

FIG. 14B shows a distribution of an intensity of the electric field generated by the first antenna patch 41 based on the signal supplied from the first power feed point FP1 of the first antenna patch 41. Referring to FIG. 14B, in a first region A1 of the first antenna patch 41, an intensity of the electric field may be measured to be a reference value or less. The reference value may be predetermined.

FIG. 14C shows a distribution of an intensity of the electric field generated by the first antenna patch 41 based on the signal supplied from the third power feed point FP3 of the first antenna patch 41. Referring to FIG. 14C, in a second region A2 of the first antenna patch 41, an intensity of the electric field may be measured to be a reference value or less. The reference value may be predetermined. The first and second penetration points VP1 and VP2 may be formed in the region PA' that is a common area between the first region A1 and the second region A2, taking into account the reduction in influence on the electric field formed by the first antenna patch 41, the efficiency in the processes of manufacturing the antenna module, etc.

Figure 15:
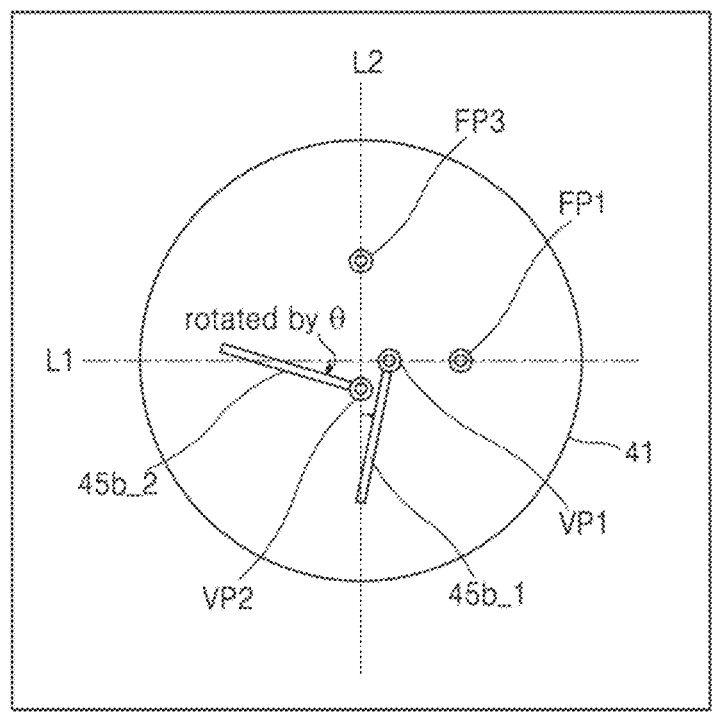
FIG. 15 is a diagram showing an example of a first horizontal power feed line and a second horizontal power feed line of FIG. 13A.

FIG. 15 is a diagram showing an example of the first horizontal power feed line 45b_1 and the second horizontal power feed line 45b_2 of FIG. 13A.

Referring to FIG. 15, the first antenna patch 41 may include the first power feed point FP1 adjacent to a first line L1 crossing over the center C of the first antenna patch 41, and the third power feed point FP3 adjacent to a second line L2 perpendicular to the first line L1 and crossing over the center C of the first antenna patch 41. In a center region of the first antenna patch 41, the first penetration point VP1 may be formed adjacent to the first line L1 and the second penetration point VP2 may be formed adjacent to the second line L2.

In some embodiments, the first horizontal power feed line 45b_1 and the second horizontal power feed line 45b_2 may be formed between the first antenna patch 41 and the second antenna patch 42a (see FIG. 13A), and a first angle between a direction in which the first horizontal power feed line 45b_1 extends and the second line L2 may be equal to a second angle between a direction in which the second horizontal power feed line 45b_2 extends and the first line L1. That is, the two angles shown in FIG. 15 may be equal. As the angle increases, an interval between the first penetration point VP1 and the second penetration point VP2 may increase.

Figure 16:
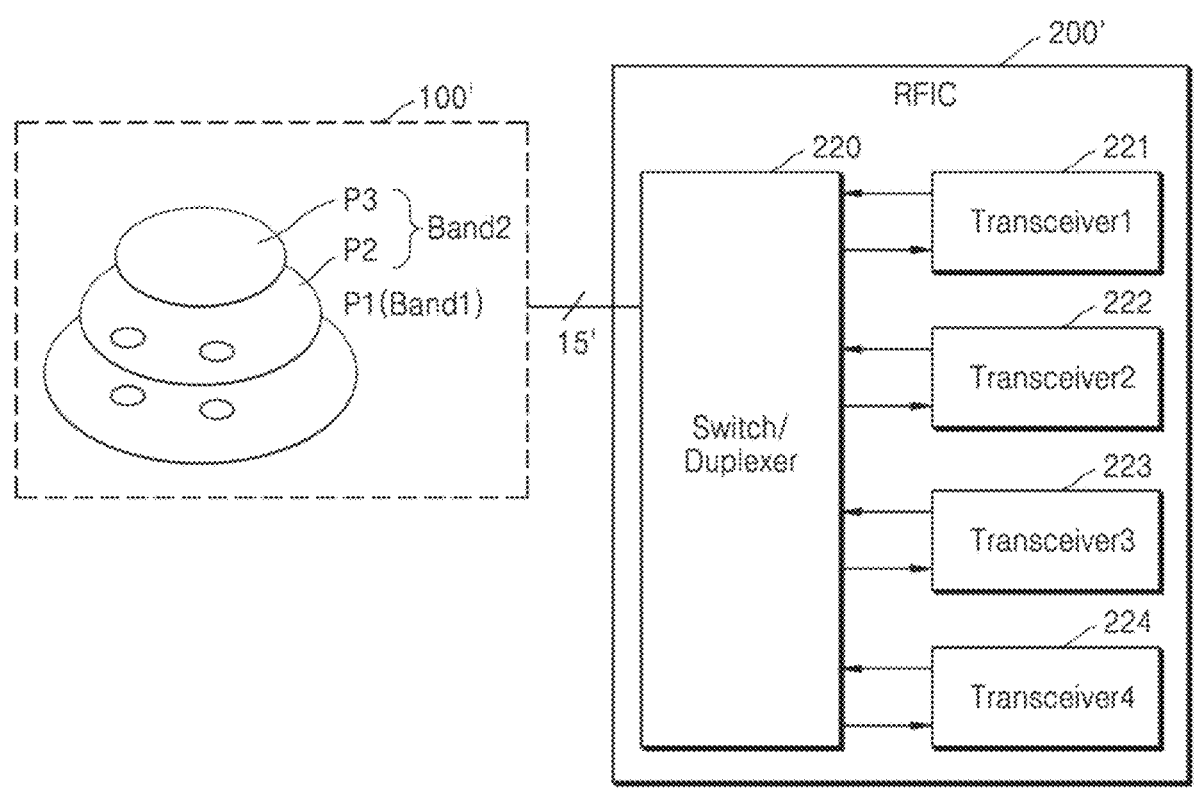
FIG. 16 is a block diagram of an antenna and an RF integrated chip (RFIC) according to an embodiment.

FIG. 16 is a block diagram of an antenna and an RFIC according to an embodiment. In detail, FIG. 16 shows an antenna 100' including two antenna patches of dual-fed, dual-polarization, and a 3-stack structure, and an RFIC 200' including first to fourth transceivers 221 to 224.

The RFIC 200' may be connected to the antenna 100' via four power feed lines corresponding to four ports of the antenna 100'. For example, as described above with reference to FIGS. 13A and 13B, an antenna module including the antenna 100' and the power feed lines 15' may be disposed on the RFIC 200' and at least one connection may be formed on an upper surface of the RFIC 200' and a lower surface of the antenna module. The antenna 100' may receive differential signals from the RFIC 200' via the four power feed lines 15' respectively connected to the four power feed points in a first antenna patch P1 and a second antenna patch P2. To this end, a pair of transceivers included in the RFIC 200' may generate one differential signal, and accordingly, four transceivers 221 to 224 may generate two differential signals.

A switch/duplexer 220 may connect/disconnect output terminals or input terminals of the four transceivers, that is, the first to fourth transceivers 221 to 224 to/from the four power feed lines 15', according to a transmission mode or a reception mode. According to the configuration shown in FIG. 16, in some embodiments, the first transceiver 221 and the second transceiver 222 may be connected to the first antenna patch P1 via the switch/duplexer 220 to perform signal transmission/reception in the first frequency band Band1, and the third transceiver 223 and the fourth transceiver 224 may be connected to the second antenna patch P2 and the third antenna patch P3 via the switch/duplexer 220 to perform the signal transmission/reception in the second frequency band Band2.

Figure 17:
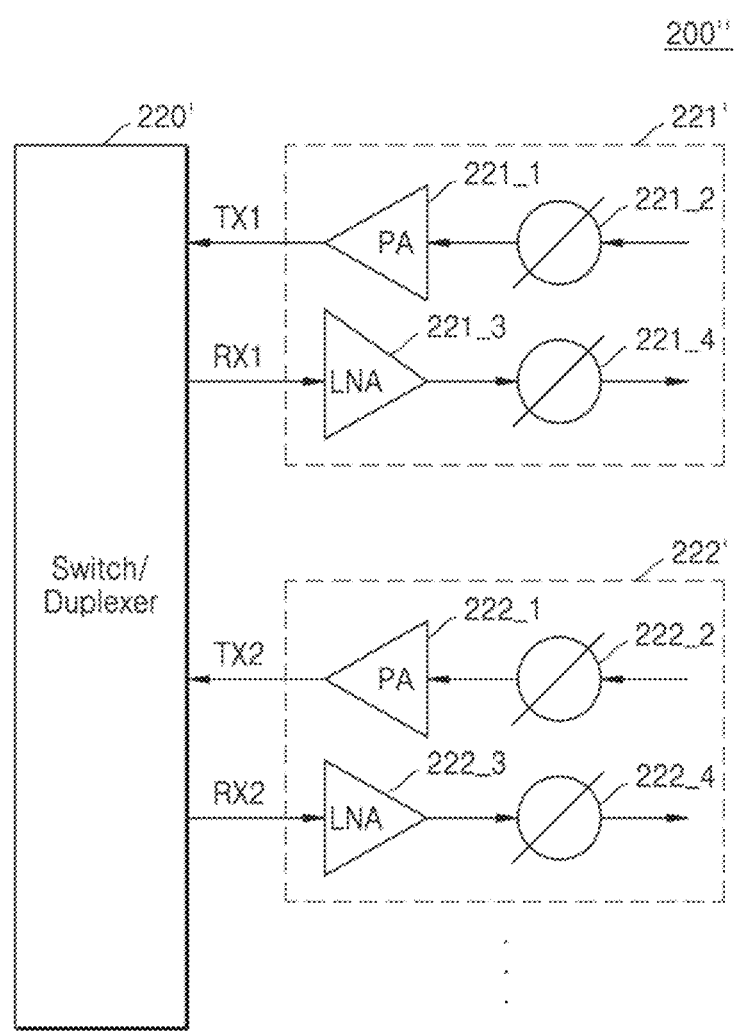
FIG. 17 is a block diagram of an RFIC according to an embodiment.

FIG. 17 is a block diagram of an RFIC 200" according to an embodiment. In detail, FIG. 17 shows examples of transceivers included in the RFIC 200' of FIG. 16. As described above with reference to FIG. 16, a first transceiver 221' and a second transceiver 222' of FIG. 17 may output differential signals, and a switch/duplexer 220' may transfer the differential signal to the power feed lines connected to the first antenna patch P1 or the second antenna patch P2 in the transmission mode. That is, a first transmission signal TX1 output from the first transceiver 221' and a second transmission signal TX2 output from the second transceiver 222' may be applied to two separate power feed points in one antenna patch. Also, a first received signal RX1 received by the first transceiver 221' and a second received signal RX2 received by the second transceiver 222' may be received from two separate power feed points in the first antenna patch P1 or the second antenna patch P2.

Referring to FIG. 17, the first transceiver 221' may include a power amplifier 221_1, a low-noise amplifier 221_3, and phase shifters 221_2 and 221_4. Similarly, the second transceiver 222' may include a power amplifier 222_1, a low-noise amplifier 222_3, and phase shifters 222_2 and 222_4. In the transmission mode, the power amplifiers 221_1 and 222_1 of the first transceiver 221' and the second transceiver 222' may respectively output the first transmission signal TX1 and the second transmission signal TX2. In the reception mode, the low-noise amplifiers 221_3 and 222_3 of the first transceiver 221' and the second transceiver 222' may respectively receive the first received signal RX1 and the second received signal RX2.

The phase shifters 221_2 and 221_4 of the first transceiver 221' may provide a phase difference of 180° from each other, and the phase shifters 222_2 and 222_4 of the second transceiver 222' may provide a phase difference of 180° from each other. For example, the phase shifter 221_2 for transmission of the first transceiver 221' may provide the power amplifier 221_1 with an output signal having a phase difference of 0° (zero) with respect to an input signal, and the phase shifter 222_2 for transmission of the second transceiver 222' may provide the power amplifier 222_1 with an output signal having a phase difference of 180° with respect to an input signal that is the same as the input signal provided to the phase shifter 221_2 for transmission of the first transceiver 221'. Accordingly, the first transmission signal TX1 and the second transmission signal TX2 may have a phase difference of 180° and may configure the differential signal. Also, the phase shifter 221_4 for reception of the first transceiver 221' may output a signal having a phase difference of 0° (zero) with respect to an output signal of the low-noise amplifier 221_3, and the phase shifter 222_4 for reception of the second transceiver 222' may output a signal having a phase difference of 180° with respect to an output signal of the low-noise amplifier 222_3.

Figure 18:
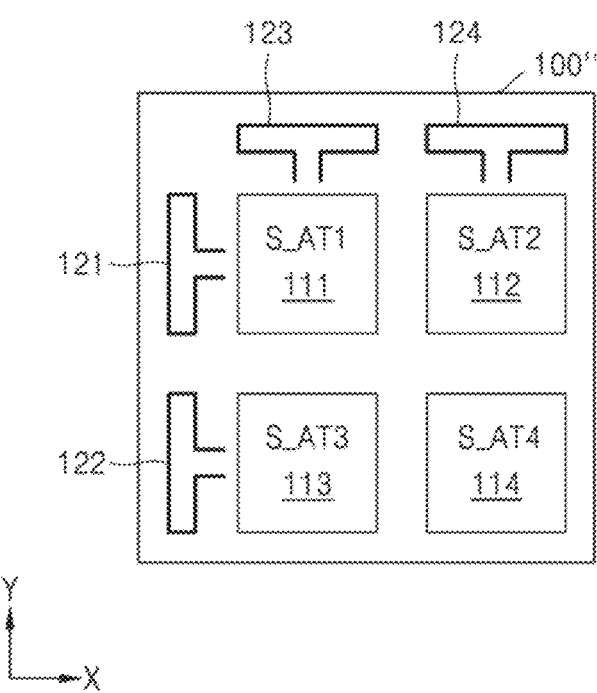
FIG. 18 is a diagram of an antenna module according to an embodiment.

FIG. 18 is a diagram of an antenna module 100" according to an embodiment. As described above with reference to the drawings, the antenna module 100" may include multi-band and multi-polarization antennas 111 to 114 respectively connected to a plurality of power feed lines, to which differential signals are supplied, and each having a structure in which a plurality of antenna patches are stacked. Two differential signals may be applied to each of the multi-band and multi-polarization antennas 111 to 114 for dual-polarization.

Referring to FIG. 18, the antenna module 100" may include dipole antennas 121 to 124, in addition to the multi-band and multi-polarization antennas 111 to 114. As described above, by adding different kinds of antennas to the multi-band and multi-polarization antennas 111 to 114, coverage may expand. Arrangements of the multi-band and multi-polarization antennas 111 to 114 and the dipole antennas 121 to 124 shown in FIG. 18 are examples, and it will be appreciated that the antennas may be disposed differently from the arrangements of FIG. 18.

Figure 19:
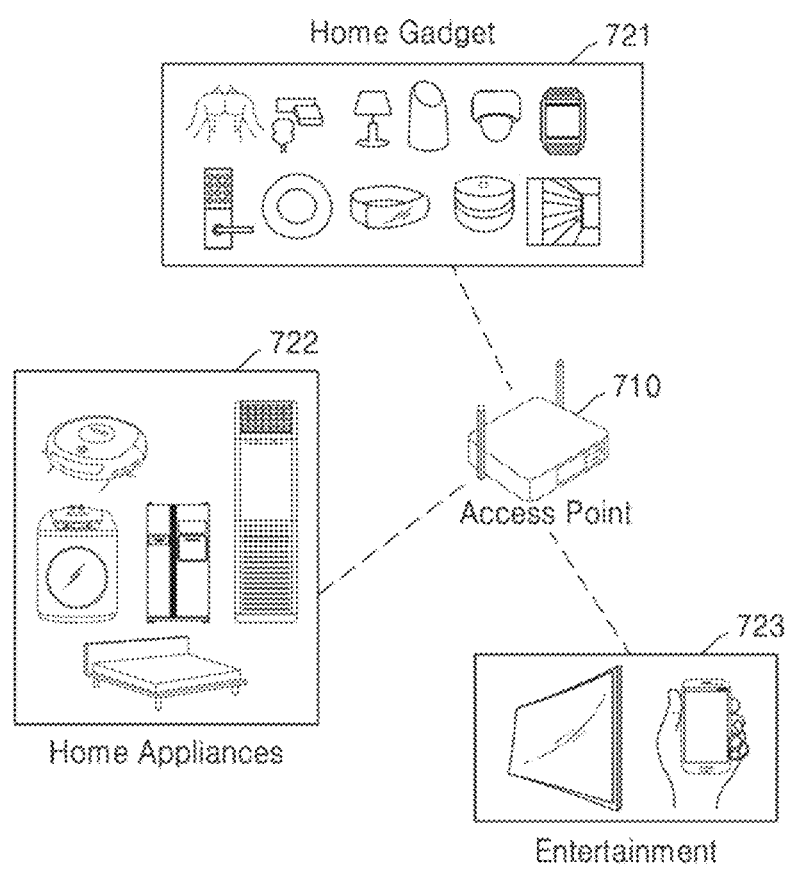
FIG. 19 is a diagram showing examples of a communication device including an antenna according to an embodiment.

FIG. 19 is a diagram showing examples of a communication device including an antenna according to an embodiment. In detail, FIG. 19 shows an example in which various wireless communication devices communicate with each other in a wireless communication system using WLAN. Each of the wireless communication devices shown in FIG. 19 may include multi-band and multi-polarization antennas, in which a plurality of antenna patches are stacked, and an RFIC providing differential signals to the multi-band and multi-polarization antennas.

Home gadgets 721, home appliances 722, entertainment devices 723, and an access point (AP) 710 may configure an Internet of Thing (IoT) network system. Each of the home gadgets 721, the home appliances 722, the entertainment devices 723, and the AP 710 may include a transceiver according to one or more embodiments as a component. The home gadgets 721, the home appliances 722, and the entertainment devices 723 may wirelessly communicate with the AP 710, or may wirelessly communicate with one another.

While the inventive concept has been particularly shown and described with reference to embodiments thereof, it will be understood that various changes in form and details may be made therein without departing from the spirit and scope of the following claims.

What is claimed is:

1. A radio frequency (RF) apparatus comprising a radio frequency integrated circuit (RFIC) chip and an antenna module disposed on an upper surface of the RFIC chip,
    wherein the antenna module comprises:
    a first antenna patch that is in parallel with the RFIC chip, the first antenna patch comprising a first penetration point, and a first power feed point connected to a first power feed line to transmit and receive a first RF signal of a first frequency band; and
    a second antenna patch disposed above the first antenna patch in parallel with the first antenna patch, the second antenna patch comprising a second power feed point connected to a second power feed line that penetrates through the first penetration point to transmit and receive a second RF signal of a second frequency band,
    wherein the first penetration point is formed in a first region of the first antenna patch in which influence on an electric field generated by the first antenna patch via the first power feed point is minimized,
    wherein the antenna module comprises a third antenna patch disposed above the second antenna patch in parallel with the second antenna patch, the third antenna patch configured to transmit and receive the second RF signal of the second frequency band spaced apart from the first frequency band by coupling to the second antenna patch,
    wherein an S parameter of the first antenna patch is lower than a reference value in the first frequency band, and
    wherein an S parameter of the second antenna patch and the third antenna patch is lower than a reference value in the second frequency band,
    wherein the first antenna patch further comprises a second penetration point, and a third power feed point connected to a third power feed line for dual-polarization radiation,
    the second antenna patch further comprises a fourth power feed point connected to a fourth power feed line that penetrates through the second penetration point, for dual-polarization radiation,
    the second power feed line comprises a first horizontal power feed line formed in parallel with the first antenna patch to connect the first penetration point to the second power feed point,
    the fourth power feed line comprises a second horizontal power feed line formed in parallel with the first antenna patch to connect the second penetration point to the fourth power feed point,
    a first angle between a direction in which the first horizontal power feed line extends and a first line crossing over a center of the first antenna patch is equal to a second angle between a direction in which the second horizontal power feed line extends and a second line that crosses the center of the first antenna patch perpendicularly to the first line, and
    each of the first angle and the second angle is proportional to a spacing between the first penetration point and the second penetration point.

2. The RF apparatus of claim 1, wherein the first antenna patch and the second antenna patch have circular shapes.

3. The RF apparatus of claim 2, wherein a first radius of the first antenna patch is different from a second radius of the second antenna patch.

4. The RF apparatus of claim 1, wherein the first antenna patch and the second antenna patch have rectangular shapes, each comprising two pairs of sides that are in parallel with each other.

5. The RF apparatus of claim 4, wherein a first width of the first antenna patch is different from a second width of the second antenna patch, and a first length of the first antenna patch is different from a second length of the second antenna patch.

6. The RF apparatus of claim 1, wherein the second power feed line comprises:
    a first vertical power feed line formed vertically to pass through the first penetration point,
    the first horizontal power feed line connected to the first vertical power feed line and formed horizontally towards the second power feed point, and a second vertical power feed line connected to the first horizontal power feed line and formed vertically to be connected to the second power feed point.

7. The RF apparatus of claim 1, wherein the first antenna patch, the second antenna patch, and the third antenna patch have different radiuses from one another.

8. The RF apparatus of claim 1, wherein the antenna module further comprises:
a first substrate between the first antenna patch and the second antenna patch; and
a second substrate between the second antenna patch and the third antenna patch,
wherein a first dielectric constant of the first substrate and a second dielectric constant of the second substrate are the same.

9. The RF apparatus of claim 1, wherein a first interval between the first antenna patch and the second antenna patch is equal to a second interval between the second antenna patch and the third antenna patch.

10. The RF apparatus of claim 1, wherein
the first power feed point and the third power feed point are configured to receive a first differential signal from the RFIC chip for transmitting and receiving the first RF signal of the first frequency band respectively through the first power feed line and the third power feed line.

11. The RF apparatus of claim 10, wherein
the second power feed point and the fourth power feed point are configured to receive a second differential signal from the RFIC chip for transmitting and receiving the second RF signal of the second frequency band respectively through the second power feed line and the fourth power feed line.

12. The RF apparatus of claim 11, wherein the second penetration point is formed in a second region of the first antenna patch in which influence on an electric field generated by the first antenna patch via the third power feed point is minimized.

13. The RF apparatus of claim 12, wherein the first region and the second region define a center region of the first antenna patch, and the first penetration point and the second penetration point are formed in the center region of the first antenna patch to be spaced apart from each other.

14. The RF apparatus of claim 11, wherein the fourth power feed line comprises:
a third vertical power feed line formed vertically to pass through the second penetration point,
the second horizontal power feed line connected to the third vertical power feed line and formed horizontally towards the fourth power feed point, and
a fourth vertical power feed line connected to the second horizontal power feed line and formed vertically to be connected to the fourth power feed point.

15. An antenna module comprising:
a ground plate;
a first antenna patch disposed above the ground plate to be in parallel with the ground plate and comprising a first penetration point, and a first power feed point connected to a first power feed line to radiate first electromagnetic waves corresponding to a first frequency band;
a second antenna patch disposed above the first antenna patch to be in parallel with the first antenna patch and comprising a second power feed point connected to a second power feed line penetrating through the first penetration point; and
a third antenna patch disposed above the second antenna patch to be in parallel with the second antenna patch,
wherein the second antenna patch and the third antenna patch are configured to radiate second electromagnetic waves corresponding to a second frequency band,
wherein the first antenna patch further comprises a second penetration point, and a third power feed point connected to a third power feed line for dual-polarization radiation,
the second antenna patch further comprises a fourth power feed point connected to a fourth power feed line that penetrates through the second penetration point, for dual-polarization radiation,
the second power feed line comprises a first horizontal power feed line formed in parallel with the first antenna patch to connect the first penetration point to the second power feed point,
the fourth power feed line comprises a second horizontal power feed line formed in parallel with the first antenna patch to connect the second penetration point to the fourth power feed point,
a first angle between a direction in which the first horizontal power feed line extends and a first line crossing over a center of the first antenna patch is equal to a second angle between a direction in which the second horizontal power feed line extends and a second line that crosses the center of the first antenna patch perpendicularly to the first line, and
each of the first angle and the second angle is proportional to a spacing between the first penetration point and the second penetration point.

16. The antenna module of claim 15, wherein the second penetration point is formed in a region of the first antenna patch in which influence on an electric field generated by the first antenna patch via the second power feed point is reduced.

17. The antenna module of claim 16, wherein the first power feed point and the third power feed point are spaced a same first distance from a first center of the first antenna patch, and
the second power feed point and the fourth power feed point are spaced a same second distance from a second center of the second antenna patch.

18. An antenna module comprising:
a first circular antenna patch comprising a first penetration point, and a first power feed point connected to a first power feed line, the first circular antenna patch being configured to radiate first electromagnetic waves corresponding to a first frequency band;
a second circular antenna patch disposed above the first circular antenna patch in parallel with the first circular antenna patch and comprising a second power feed point connected to a second power feed line passing through the first penetration point; and
a third circular antenna patch disposed above the second circular antenna patch to be in parallel with the second circular antenna patch,
wherein the second circular antenna patch and the third circular antenna patch are configured to radiate second electromagnetic waves corresponding to a second frequency band,
wherein the first circular antenna patch further comprises a second penetration point, and a third power feed point connected to a third power feed line for dual-polarization radiation,
the second circular antenna patch further comprises a fourth power feed point connected to a fourth power feed line that penetrates through the second penetration point, for dual-polarization radiation, the second power feed line comprises a first horizontal power feed line formed in parallel with the first circular antenna patch to connect the first penetration point to the second power feed point, the fourth power feed line comprises a second horizontal power feed line formed in parallel with the first circular antenna patch to connect the second penetration point to the fourth power feed point, a first angle between a direction in which the first horizontal power feed line extends and a first line crossing over a center of the first circular antenna patch is equal to a second angle between a direction in which the second horizontal power feed line extends and a second line that crosses the center of the first circular antenna patch perpendicularly to the first line, each of the first angle and the second angle is proportional to a spacing between the first penetration point and the second penetration point, the first penetration point and the second penetration point are formed in a center region of the first circular antenna patch, in which influence on an electric field generated by the first circular antenna patch is reduced, wherein the second frequency band is spaced apart from the first frequency band, wherein an S parameter of the first circular antenna patch is lower than a reference value in the first frequency band, wherein an S parameter of the second circular antenna patch and the third circular antenna patch is lower than a reference value in the second frequency band.

* * * * *